US010408316B2

(12) United States Patent
Rompel et al.

(10) Patent No.: US 10,408,316 B2
(45) Date of Patent: Sep. 10, 2019

(54) PLANETARY GEAR SYSTEM

(71) Applicant: Black & Decker Inc., New Britain, CT (US)

(72) Inventors: Markus Rompel, Schadeck (DE); Rafael Gottschling, Selters-Eisenbach (DE); Santiago Hernandez-Arenas, Bremen (DE)

(73) Assignee: Black & Decker Inc., New Britain, CT (US)

( * ) Notice: Subject to any disclaimer, the term of this patent is extended or adjusted under 35 U.S.C. 154(b) by 90 days.

(21) Appl. No.: 15/363,143

(22) Filed: Nov. 29, 2016

(65) Prior Publication Data

US 2017/0167585 A1 Jun. 15, 2017

(30) Foreign Application Priority Data

Dec. 10, 2015 (GB) .................................. 1521734.2

(51) Int. Cl.
*F16H 35/10* (2006.01)
*B25B 23/14* (2006.01)
(Continued)

(52) U.S. Cl.
CPC ........... *F16H 35/10* (2013.01); *B25B 23/141* (2013.01); *B25D 16/003* (2013.01); *B25D 16/006* (2013.01); *B25F 5/001* (2013.01); *F16D 7/005* (2013.01); *F16D 7/06* (2013.01); *F16H 1/28* (2013.01); *B25D 2211/068* (2013.01); *B25D 2216/0015* (2013.01); *B25D 2216/0023* (2013.01); *B25D 2216/0038* (2013.01); *B25D 2250/165* (2013.01)

(58) Field of Classification Search
CPC . F16H 35/10; F16H 1/28; F16D 7/005; B25D 16/003; B25F 5/001
See application file for complete search history.

(56) References Cited

U.S. PATENT DOCUMENTS

2006/0237205 A1* 10/2006 Sia .......................... B25B 21/00
173/48
2006/0291966 A1* 12/2006 Klemm ................. B23B 45/008
408/124
2013/0324348 A1 12/2013 Ross

FOREIGN PATENT DOCUMENTS

| EP | 1 238 847 | 9/2002 |
| WO | 95/22705 | 8/1995 |
| WO | WO-95/22705 A1 * | 8/1995 ............. F16H 61/06 |

OTHER PUBLICATIONS

Extended EP Search Report dated Apr. 24, 2017 issued in corresponding EP patent application, (7 pages).

* cited by examiner

*Primary Examiner* — Mark J Beauchaine
(74) *Attorney, Agent, or Firm* — Amir Rohani

(57) ABSTRACT

A planetary gear system with a sun gear, a ring gear co-axial with the sun gear, at least one planetary gear meshing with both the sun gear and the ring gear, and a planetary gear carrier which rotationally supports the at least one planetary gear. A torque clutch is supported by and connected directly between two of the sun gear, the ring gear, the at least one planetary gear and the planetary gear carrier. The torque clutch prevents relative rotation when an acting torque is below a predetermined torque value and allows relative rotation when the acting torque is above the predetermined torque value. A torque threshold adjustment mechanism is provided for adjusting the predetermined value of the torque at which the torque clutch slips.

20 Claims, 14 Drawing Sheets

(51) Int. Cl.
*F16H 1/28* (2006.01)
*B25D 16/00* (2006.01)
*B25F 5/00* (2006.01)
*F16D 7/00* (2006.01)
*F16D 7/06* (2006.01)

PLANETARY GEAR SYSTEM

FIELD OF THE INVENTION

The present invention relates to a planetary gear system with a torque clutch.

BACKGROUND

A hammer drill includes a tool holder in which a cutting tool, such as a drill bit, can be supported and driven by the hammer drill. The hammer drill can often drive the cutting tool in three different ways, each being referred to as a mode of operation. The cutting tool can be driven in a hammer only mode, a rotary only mode and a combined hammer and rotary mode. A hammer drill will typically comprise an electric motor and a transmission mechanism by which the rotary output of the electric motor can either rotationally drive the cutting tool to perform the rotary only mode or repetitively strike the end of a cutting tool to impart axial impacts onto the cutting tool to perform the hammer only mode or rotationally drive and repetitively strike the cutting tool to perform the combined hammer and rotary mode. EP1674207 describes an example of such a hammer drill.

An impact driver includes a tool holder in which a tool, such as a screw driver bit, can be supported and rotationally driven by the impact driver. The impact driver comprises a tangential impact mechanism which is activated when a large torque is experienced by the tool. The tangential impact mechanism imparts tangential (circumferential or rotational) impacts onto the tool until the torque applied to the tool drops below a predetermined value. US2005/0173139 describes an example of such an impact driver.

It is known to provide hammer drills with an additional tangential impact mechanism so that the hammer drill can impart rotational impacts onto a cutting tool in addition to axial impacts. U.S. Pat. No. 7,861,797, WO2012/144500 and DE1602006 all disclose such hammer drills. However, in each of these hammer drills the additional tangential impact mechanism is rotationally driven at a same rate as the rate of rotation of the output spindle.

SUMMARY

The object of the present invention is to provide an improved planetary gear system which can be utilized in a hammer drill with an additional tangential impact mechanism to provide an improved operational performance. However, it will be appreciated that the use of such an improved planetary gear system is not limited to a hammer drill or even a power tool but could be used in wide range of types of machinery.

By providing a torque clutch having an adjustable torque setting which preferably forms an integral part of a planetary gear system and which is directly connected between and supported by two component parts of the planetary system only, it provides a compact planetary gear system which requires no interaction of the adjustable torque clutch with any component part of the power tool (or other type of machinery) in which the planetary gear system is mounted. Furthermore, it may enable the planetary gear system with an adjustable overload clutch to be constructed as a single stand-alone component as the torque clutch may not the need to have any interaction with other component parts of a power tool (or other type of machinery) in which it is mounted in order for the adjustable torque clutch to operate.

DESCRIPTION

Figure 1:
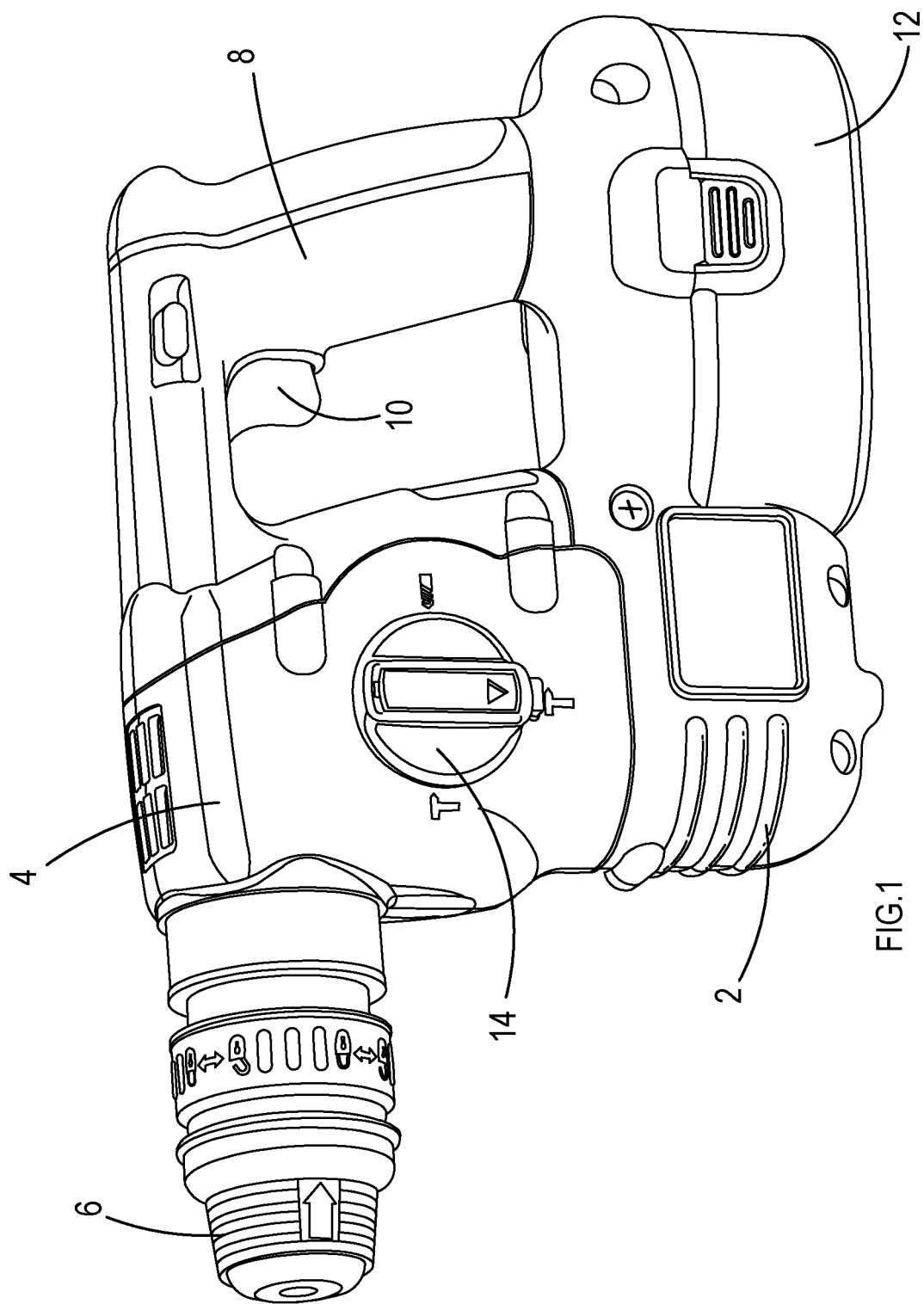
FIG. 1 shows an example of a side view of a hammer drill with a tangential impact mechanism.

Referring to FIG. 1, the hammer drill comprises a motor housing 2 in which is located an electric motor 100 and a transmission housing 4 in which is located a hammer mechanism (which is described in more detail below) to impart axial impacts onto a cutting tool, a rotary drive (which is described in more detail below) to rotationally drive a cutting tool and a tangential (rotational) impact mechanism (which is described in more detail below) to impart tangential impacts to a cutting tool. A tool holder 6 is attached to the front of the transmission housing 4 which is capable of supporting a cutting tool to be driven by the hammer drill. A handle 8 is attached at one end to the motor housing 2 and at the other end to the transmission housing 4. A trigger button 10 is mounted within the handle 8 which is used by the operator to activate the electric motor 100. A battery pack 12 is attached to the base of the handle 8 which provides electrical power to the motor 100. A mode change knob 14 is mounted on the side of the transmission housing 2. The knob 14 can be rotated to three different positions to change the mode of operation of the hammer drill between hammer only mode, rotary only mode and combined rotary and hammer mode.

Figure 2:
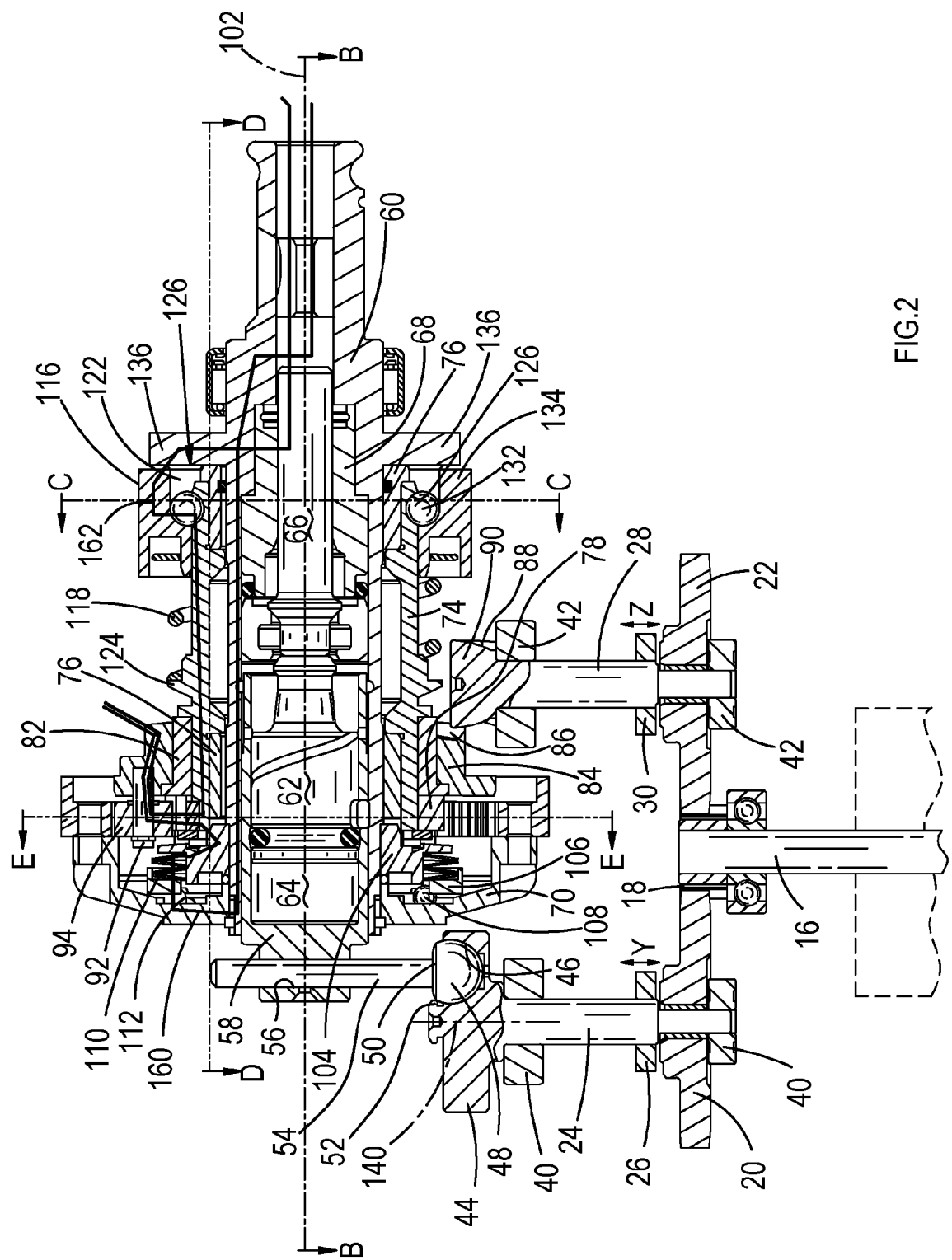
FIG. 2 shows a vertical cross section of the rotary drive, the hammer mechanism and the tangential impact mechanism of the hammer drill shown in FIG. 1.
Figure 3:
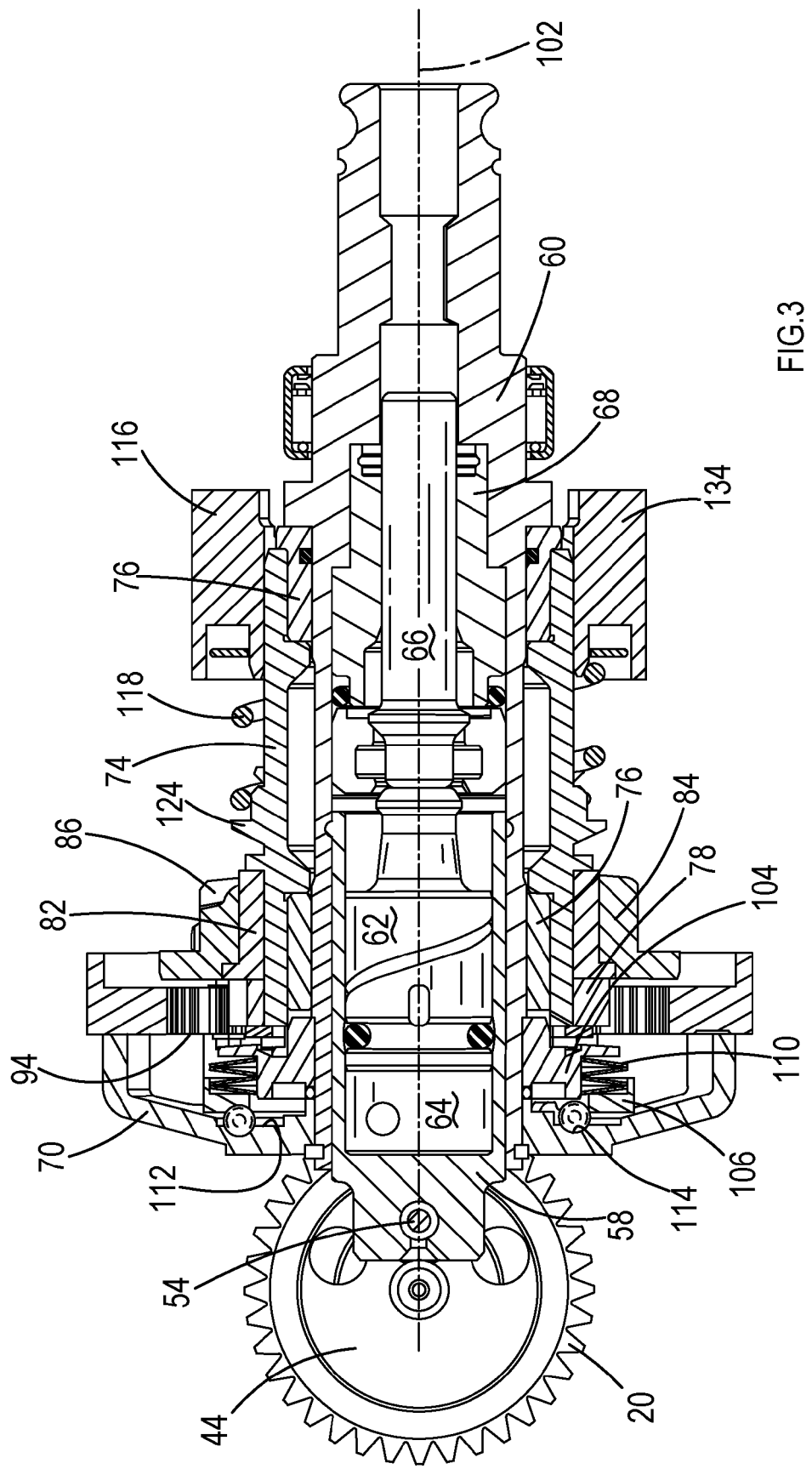
FIG. 3 shows a horizontal cross section of the rotary drive, the hammer mechanism and the tangential impact mechanism of the hammer drill in the direction of Arrows B in FIG. 2.
Figure 4:
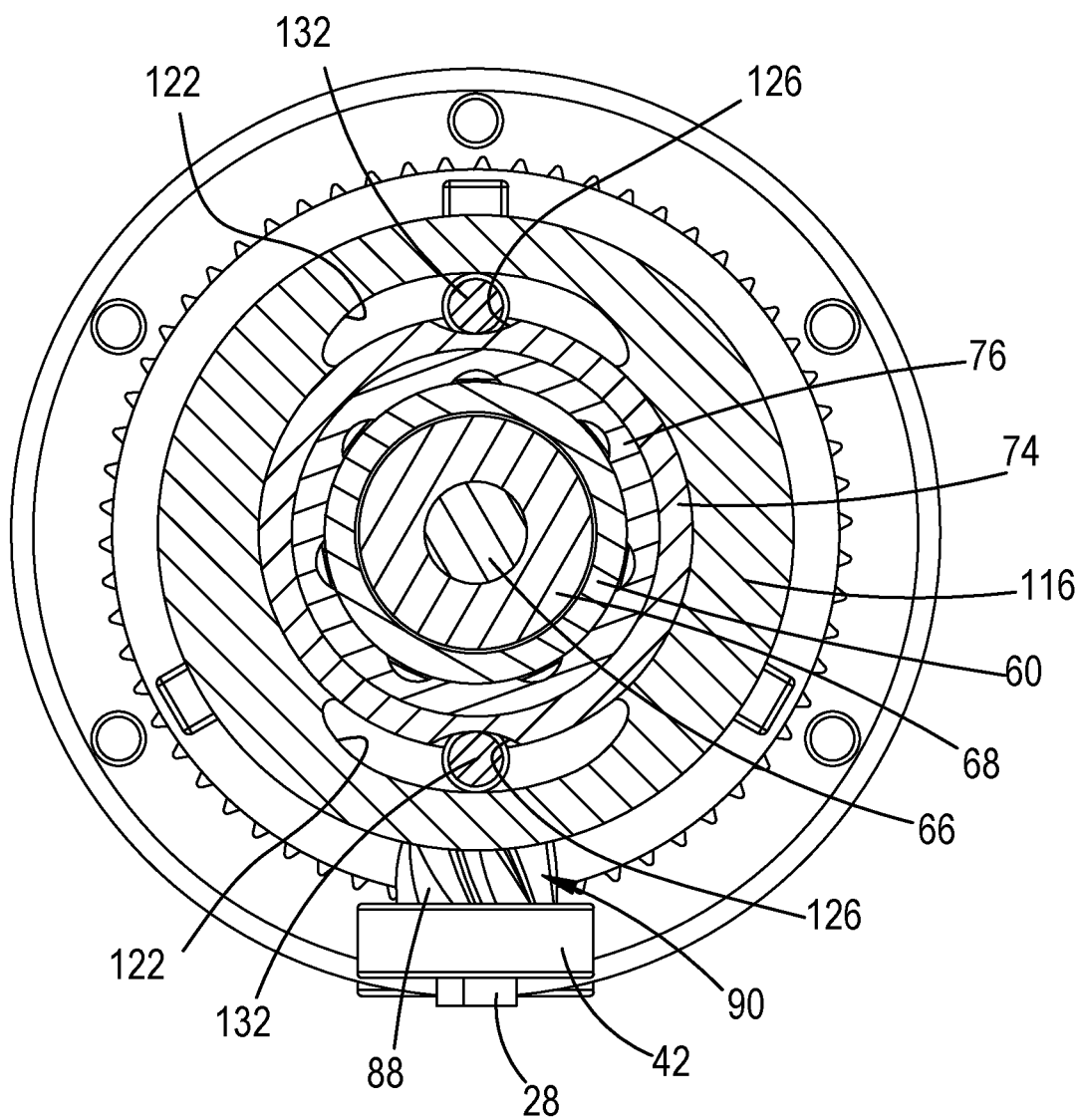
FIG. 4 shows a vertical cross section of the spindle and the tangential impact mechanism of the hammer drill in the direction of Arrows C in FIG. 2.
Figure 5:
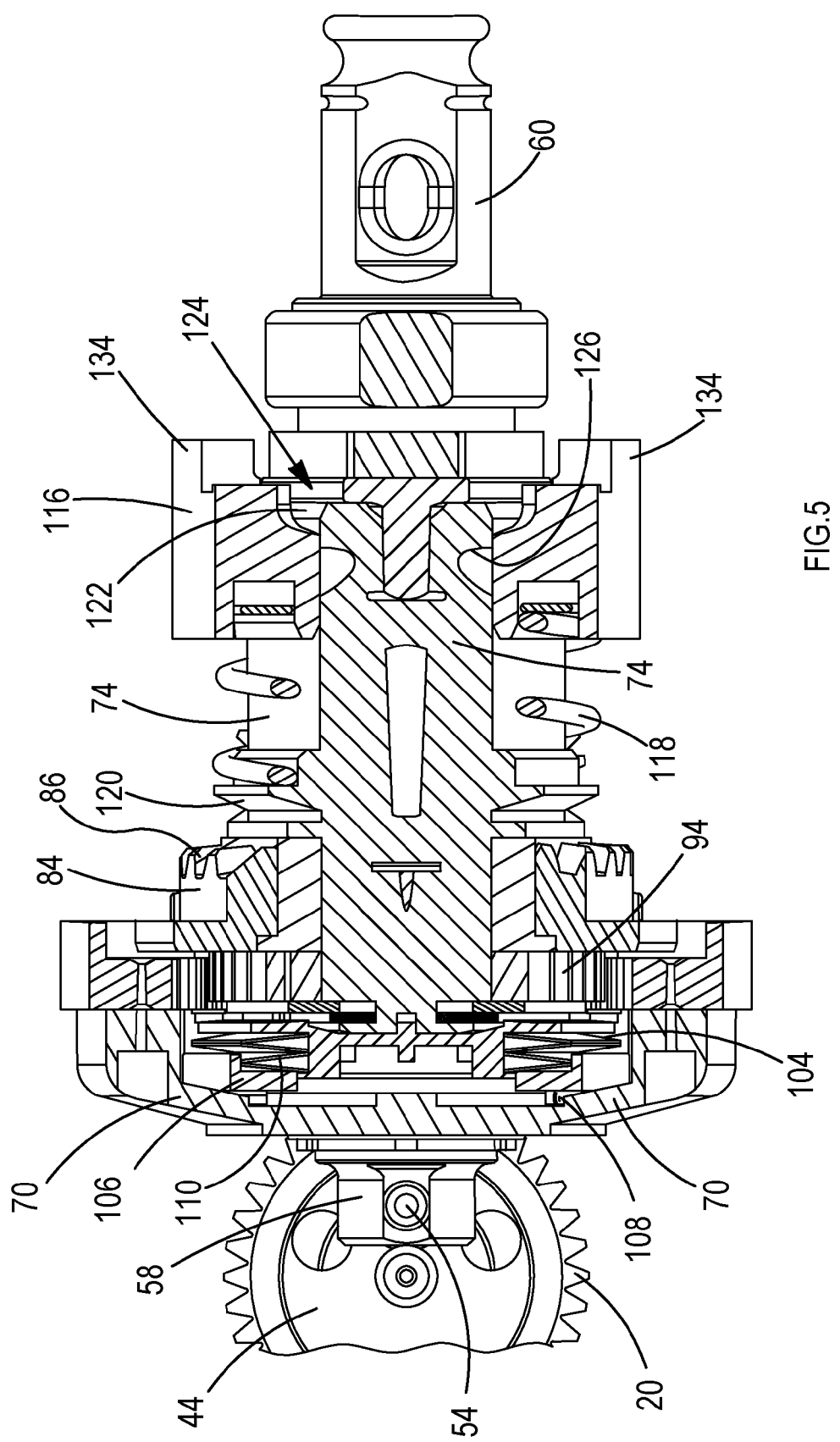
FIG. 5 shows a horizontal cross section of the rotary drive, the hammer mechanism and the tangential impact mechanism of the hammer drill in the direction of Arrows D in FIG. 2.

Referring to FIG. 2, the motor 100 has a drive spindle 16 with teeth 18 which mesh with two gears 20, 22.

The first gear 20 is capable of being drivingly connected to a first shaft 24 (which is rotationally mounted within the transmission housing 2 by bearings 40) via a first sleeve 26. The first sleeve 26 can axially slide in the direction of Arrow Y along the first shaft 24 but is rotationally fixed to the first shaft 24. The first gear 20 can freely rotate on the first shaft 24. The side of the first sleeve 26 comprises teeth (not shown) which can engage with teeth (not shown) formed on the side of the first gear 20 when the first sleeve 26 is moved into engagement with the first gear 24 to drivingly connect the first sleeve 26 with the first gear 20. When the first sleeve 26 is drivingly engaged with the first gear 20, the rotational movement of the first gear 20 is transferred to the first shaft 24.

The second gear 22 is capable of being drivingly connected to a second shaft 28 (which may be rotationally mounted within the transmission housing 2 by bearings 42) via a second sleeve 30. The second sleeve 30 can axially slide in the direction of Arrow Z along the second shaft 28 but is preferably rotationally fixed to the second shaft 28. The second gear 22 can preferably freely rotate on the second shaft 28. The side of the second sleeve 30 preferably comprises teeth (not shown) which can engage with teeth (not shown) formed on the side of the second gear 22 when the second sleeve 30 is moved into engagement with the second gear 22 to drivingly connect the second sleeve 30 with the second gear 22. When the second sleeve 30 is drivingly engaged with the second gear 22, the rotational movement of the second gear 22 is preferably transferred to the second shaft 28.

The movement of the two sleeves 26, 30 may be controlled by a mode change mechanism, designs of which are well known in art. For example, the sleeves 26, 30 can be moved by a see-saw arrangement similar to that described in EP1674207 (corresponding to U.S. Pat. No. 7,306,049, which is hereby incorporated by reference). By moving the first sleeve 26 only into engagement with the first gear 20, the second sleeve 30 only into engagement with the second gear 22, or both sleeves 26, 30 into engagement with their respective gears 20, 22, the mode of operation of the hammer drill can be changed between hammer only mode, rotary only mode and combined rotary and hammer mode respectively. The mode change mechanism is controlled by rotation of the mode change knob 14. As the mode change mechanism does not form part any part of the present invention, it will not be described in any more detail.

A crank plate 44 may be rigidly attached to the top of the first shaft 24. A recess 46 is formed within the crank plate 44 in which is located a part spherical ball 48. The part spherical ball 48 can pivot over a range of angles within the recess 46. The part spherical ball 48 is preferably prevented from exiting the recess 46 by a shoulder 50 engaging with a lip 52 formed on the crank plate 44. A drive shaft 54 may be rigidly connected to and extends from the part spherical ball 48. The shaft 54 preferably passes through and is capable of axially sliding within a tubular passage 56 formed in the rear of a hollow piston 58 which is preferably mounted within the rear end of a hollow output spindle 60. Rotation of the crank plate 44 preferably results in a reciprocating movement of the hollow piston 58 within the hollow output spindle 60.

A ram 62 may be mounted within the hollow piston 58 which is preferably reciprocatingly driven by the reciprocating piston 58 via an air spring 64. The ram 62 may repetitively strike a beat piece 66 mounted within a beat piece support structure 68 inside of the hollow spindle 60, which in turn repetitively strikes an end of a cutting tool held by the tool holder 6 inside the front end of the hollow spindle 60.

Figure 6:
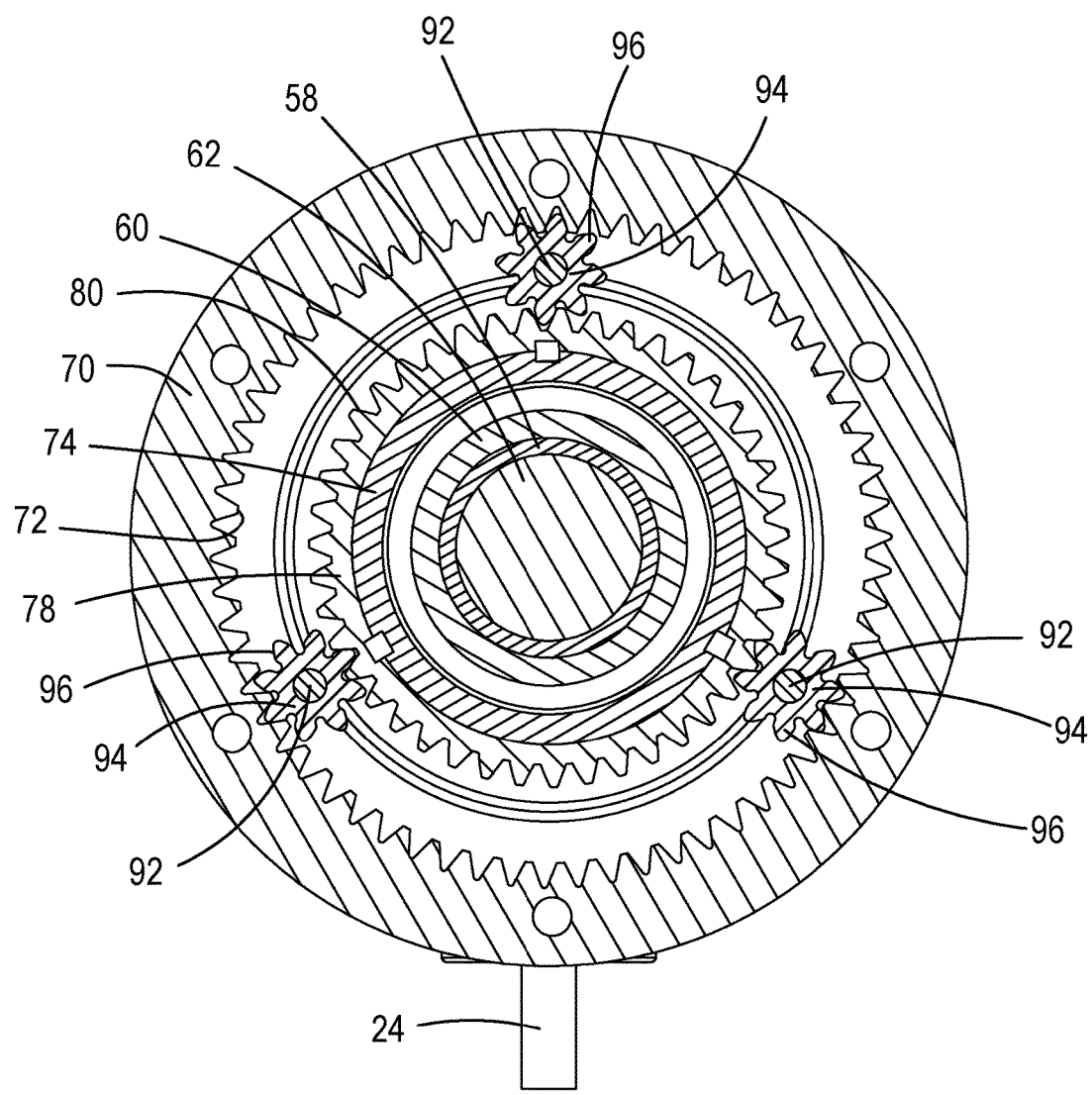
FIG. 6 shows a vertical cross section of the planetary gear mechanism of the hammer drill in the direction of Arrows E in FIG. 2.

Mounted on the rear part of the hollow output spindle 60 in a rigid manner is a cup shaped gear 70 with teeth 72 formed on an inner wall facing inwardly towards the hollow spindle 60 as best seen in FIG. 6. Rotation of the hollow spindle 60 about its longitudinal axis 102 preferably results in rotation of the cup shaped gear 70 and vice versa.

Sleeve 74 may be rotationally mounted on the hollow spindle 60 via bearings 76. The sleeve 74 is preferably axially fixed relative to the hollow spindle 60. The rear end of the sleeve 74 preferably extends inside of the cup shaped gear 70. An annular shaped gear 78 may be rigidly mounted on the rear end of the sleeve 74 inside of the cup shaped gear 70 which preferably has teeth 80 which face away radially outwardly from the hollow spindle 60 towards the teeth 72 of the cup shaped gear 70. Rotation of the sleeve 74 preferably results in rotation of the annular shaped gear 78 and vice versa.

A sliding bearing 82 is preferably mounted on the sleeve 74. A ring shaped first bevel gear 84 is preferably mounted on the sliding bearing 82 in a freely rotatable manner. The first bevel gear 84 is capable of freely rotating around the sleeve 74 on the slide bearing 82 but is preferably axially fixed relative to the sleeve 74. The first bevel gear 84 preferably comprises teeth 86 which mesh with teeth 88 of a second bevel gear 90 rigidly attached to the second shaft 28. Rotation of the second shaft 22 preferably results in rotation of the second bevel gear 90 which in turn rotates the first bevel gear 84 on the slide bearing 82 around the sleeve 74.

Three pins 92 may be attached to the side of the first bevel gear 84 in angular positions of 120 degrees relative to each other. The pins 92 preferably extend rearwardly in parallel to the longitudinal axis 102 of, the hollow spindle 60 and to each other into the inside of the cup shape gear 70. A circular gear 94 with teeth 96 may be mounted on each pin 92 in a freely rotatable manner. The teeth 96 of all three circular gears 94 preferably mesh with both the teeth 72 of the cup shaped gear 70 and the teeth 80 of the annular shaped gear 78. The three circular gears 94, the cup shaped gear 70, the annular shaped gear 78 and the first bevel gear 84 preferably form a planetary gear system with the three circular gears 94 forming the planetary gears, the cup shaped gear 70 forming a ring gear, the annular shaped gear 78 forming the sun gear and the first bevel gear 84 forming the carrier for the planetary gears 94.

A clutch sleeve 104 may be rigidly attached to the rear of the sleeve 74. Preferably mounted on the clutch sleeve 104 is a ring shaped ball bearing cage 106 which holds a number of ball bearings 108 in preset positions within the ball bearing cage 106 but in a freely rotatable manner. The ball bearing cage 106 can axially slide on the clutch sleeve 104 but is preferably rotationally fixed to the clutch sleeve 104. Sandwiched between the clutch sleeve 104 and ball bearing cage 106 are four bevel washers 110 which act as a spring, preferably urging the ball bearing cage 106 rearwardly towards a side wall 112 of the cup shaped gear 70. A groove (not shown) may be formed within the side wall 112 around the axis 102 of the hollow spindle 60. The groove preferably acts as a path for the ball bearings 108. A number of indentations 114 corresponding to the number and relative positions of the ball bearings 108 are preferably formed along, the path. The ball bearings 108 may be held within the path and indentations by the ball bearing cage 106 which presses them against the wall 112 due to the biasing force of the bevel washers 110. The clutch sleeve 104, the bevel washers 110, the ball bearing cage 106, the ball bearings 108 and the path with the indentations 114 within the wall 112 of the cup shaped gear 70 form a torque clutch.

Figure 7:
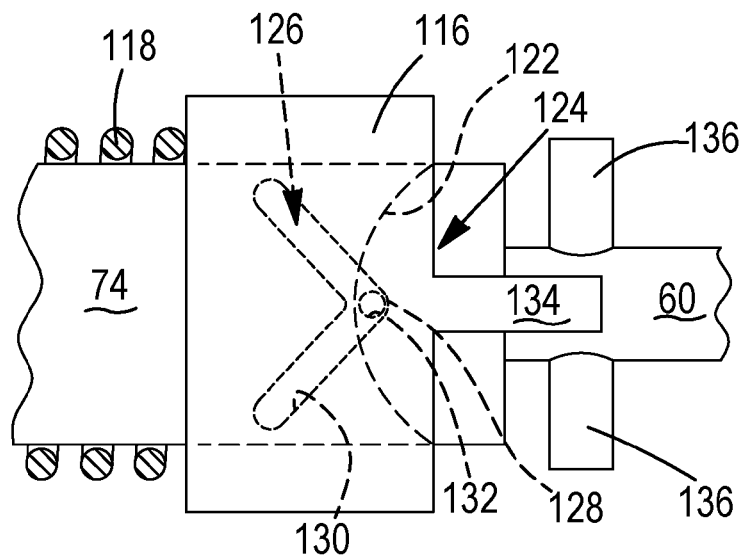
FIG. 7 shows a sketch of the spindle, sleeve with the V shaped grooves, the anvil, the U shaped recesses and the interconnecting ball bearings.

An anvil 116 is preferably mounted on the sleeve 74. The anvil 116 can axially slide along the sleeve 74 or rotate around the sleeve 74. Formed on the inside of the anvil 116, on opposite sides of the sleeve 74 in a symmetrical manner, are two U shaped recesses 122 (shown as dashed lines in FIG. 7) of the same dimensions, the entrances 124 of which preferably face forward. The height of the U shaped recess 122 is preferably constant across the length and width of the U shaped recess 122. Formed on the outside of the sleeve 74, on opposite sides of the sleeve 74 in a symmetrical manner, are two V shaped grooves 126, the apexes 128 of which point forward. Each arm 130 of each of the V shaped grooves 126 preferably extends both around the sleeve 74 and rearwardly (left in FIG. 2) along the sleeve 74 in a spiral manner, the arms 130 of each V shaped groove 126 being symmetrical with the other arm 130 of the same V shaped groove 126. The anvil 116 may be mounted on the sleeve 74 so that each U shaped recess 122 locates above and faces towards a V shaped groove 126. A ball bearing 132 preferably locates in each V shaped groove 126, the diameter of the two ball bearings 132 being equal. The diameter of the ball bearings 132 is preferably greater than the depth of the V shaped grooves 126 and therefore the side of the ball bearings 132 project into the U shaped recesses 122. The diameter of the ball bearings 132 is preferably slightly less than the depth of the V shaped grooves and height of the U shaped recesses 122 so that the ball bearings are held within the V shaped grooves 126 by an inner wall of the U shaped recesses 122.

A helical spring 118 is preferably sandwiched between the anvil 116 and a shoulder 120 formed on the sleeve 74 to urge the anvil 118 in a forward (right in FIG. 2) direction. When the anvil 116 is urged forward, the ball bearings 132 engage with the rear walls of the U shaped recesses 122 and are then urged forward. As the ball bearing 132 are moved forward, they move along an arm 130 of a V shaped groove 126 until they reach the apex 128. The apex 130 of the V shaped grooves prevents any further forward movement of the ball bearings 132. The ball bearings 132 in turn prevent any further forward movement of the anvil 116. The ball bearings 132, V shaped grooves 126 and U shaped recesses 122 together with the spring 118 form a cam system by which the relative axial position of the anvil 116 on the sleeve 74 is controlled as the anvil 116 rotates relative to the sleeve 74.

Formed on the front of the anvil 116, on opposite sides of the anvil 116, in a symmetrical manner are preferably two protrusions 134 which extend in a forward direction (right in FIG. 2) parallel to the longitudinal axis 102 of the spindle 60. Formed on opposite sides of the spindle 60 in a symmetrical manner are two impact arms 136 which extend perpendicularly to the longitudinal axis 102 of the spindle 60 away from the spindle 60 in opposite directions. When the ball bearings 132 are located at the apex of the V shaped grooves 126, resulting in the anvil 116 being in its most forward position, the two protrusions 134 preferably extend in a forward direction past the two impact arms 136. The length of the impact arms 136 is such that if the spindle 60 rotates relative to the sleeve 74 (with the anvil 116 which is mounted on and connected to the sleeve 74 via the cam system) and the anvil 116 is in its most forward position, the side surfaces of the impact arms 136 would engage with the side surfaces of the protrusions 134 and prevent any further rotation of the anvil 116.

The spring 118, anvil 116, sleeve 74, V shaped grooves 126, the ball bearings 132, the U shaped recesses 122, and protrusions 134 preferably form a tangential impact mechanism which imparts tangential strikes onto the side surfaces of the impact arms 136 of the spindle 60.

The operation of the hammer drill will now be described. In order to operate the hammer drill in hammer only mode, the first sleeve 26 is preferably moved into driving engagement with the first gear 20 (downwards in FIG. 2) while the second sleeve 30 is moved out of driving engagement with the second gear 22 (upwards in FIG. 2) by the mode change mechanism. As such, the rotation of the first gear 20 results in rotation of the first shaft 24 while the rotation of the second gear 22 is not transferred to the second shaft 28. Therefore rotation of the drive spindle 16 preferably results in rotation of the first shaft 24 only via the first gear 20 and the first sleeve 26.

Rotation of the first shaft 24 preferably results in rotation of the crank plate 44 which in turn results in the rotation of spherical ball 48 and the drive shaft 54 around the axis 140 of the first shaft 24. As the drive shaft 54 can only slide within the tubular passage 56 of the hollow piston 58 which passage 56 extends perpendicularly to the axis 102 of the spindle 60, it will always extend in a direction perpendicular to the axis 102 of the spindle 60 and therefore the whole of the drive shaft 54 moves left and right (as shown in FIG. 2) in a reciprocating manner in a direction parallel to the axis 102 of the spindle 60 whilst pivoting about the axis 102 of the spindle 60 at the same time.

As the drive shaft 54 reciprocatingly moves left and right in a direction parallel to the axis of the spindle 60, it reciprocatingly moves the hollow piston 54 within the spindle 60. The reciprocating movement of the hollow piston 58 is transferred to the ram 62 via an air spring 64. The reciprocating ram 62 repetitively strikes the beat piece which in turn repetitively strikes a cutting tool held within the end of the spindle 60 by the tool holder 6.

In order to operate the hammer drill in rotary only mode, the first sleeve 26 is preferably moved out of driving engagement with the first gear 20 (upwards in FIG. 2) while the second sleeve 30 is moved into driving engagement with the second gear 22 (downwards in FIG. 2) by the mode change mechanism. As such, rotation of the second first gear 22 results in rotation of the second shaft 28 while the rotation of the first gear 20 is not transferred to the first shaft 24. Therefore, rotation of the drive spindle 16 results in rotation of the second shaft 28 only via the second gear 22 and the second sleeve 30.

Rotation of the second shaft 24 preferably results in rotation of the second bevel gear 90 which in turn results in the rotation of the first bevel gear 84 about the axis of the spindle 60. This in turn results in the three pins 92 moving sideways, perpendicularly to their longitudinal axes, around the axis 102 of the spindle 60. This in turn results in the three circular gears 94 rotating around the axis 102 of the spindle 60.

Under normal operating conditions, the amount of restive torque on the hollow spindle 60 is low and therefore is less than that of the threshold of the torque clutch. As such, the ball bearings 108 of the torque clutch remain held within the indentations 114 in path on the side wall 112 of the cup shaped gear 70 due to spring force of the bevel washers 110. Therefore, the cup shaped gear 70 is preferably held rotationally locked to the clutch sleeve 104 which in turn results in the cup shaped gear 70 being rotationally locked to the annular shaped gear 78. As such there is no relative rotation between the cup shaped gear 70 and the annular shaped gear 78. This is referred to the torque clutch "not slipping".

The circular gears 94 are preferably drivingly engaged with both the cup shaped gear 70 and the annular shaped gear 78. Therefore, as the pins 92 rotate around the axis 102 of the spindle 60, the three circular gears 94 also rotate around the axis 102 causing both the cup shaped gear 70 and the annular shaped gear 78, which are rotationally locked to each other, also to rotate around the axis 102 in unison. As the cup shaped gear 70 and the annular shaped gear 78 are rotationally locked to each other and move in unison, the three circular gears 94 do not rotate around the pins 92 upon which they are mounted.

As such, the spindle 60, which is rigidly connected to the cup shape gear 70, also rotates around the axis 102. This in turn rotatingly drives the tool holder 6 which in turn rotatingly drives any cutting tool held the tool holder within the end of the spindle 60. The sleeve 74, which is rigidly connected to annular shape gear 78, also rotates an as the cup shaped gear 70 and the annular shaped gear 78 are rotationally locked to each other. As such, the sleeve 74 will rotate at the same rate and in the same direction as the spindle 60. As there is no relative rotation between the sleeve 74 and spindle 60, there is no movement of the anvil 116 and therefore the tangential impact mechanism will not operate. As such, there is a smooth rotary movement applied to the spindle 60. The driving force is transferred from the first bevel gear 84 to a cutting tool held within the front end of the spindle 60 via the path indicated by solid line 160. The rate of rotation of the spindle 60 versus the drive spindle 6 is preferably determined by the gear ratios between the drive spindle 16 and the second gear 22 and the gear ratio between the second bevel gear 90 and the first bevel gear 84.

However, when the operating conditions cease to be normal and the amount of restive torque on the spindle 60 is excessive, for example during kick back where a cutting tool is prevented from further rotation within a work piece, the restive torque becomes greater than that of the threshold of the torque clutch. When the amount of restive torque on the spindle 60 is excessive, the rotation of the spindle 60 will be severely hindered or even completely stopped. However, the drive spindle 60 of the motor 10 will preferably continue to rotate, rotationally driving the second gear 22, second shaft 28, the second bevel gear 90 and first bevel gear 84 which in turn will continue to rotationally drive the pins 92 and circular gears 94 around the axis 102 of the spindle 60. However, as rotation spindle 60 is hindered or stopped, the rotation of the cup shaped gear 70 is similarly hindered or stopped. Therefore, the torque clutch slips due to the ball bearings 108 of the torque clutch moving out of the indentations 114 in path on the side wall 112 of the cup shaped gear 70 against the spring force of the bevel washers 110 and travelling along the path, allowing the cup shape gear 70 to rotate in relation to the clutch sleeve 104. This in turn allows the annular shaped gear 78 to rotate in relation to the cup shaped gear 70. Therefore the rate of rotation of the cup shaped gear 70 and the annular shaped gear 78 will be different. As the circular gears 94 are meshed with the cup shaped gear 70, each of the three circular gears 94 will be caused to rotate around the pin 92 upon which they are mounted in addition to rotating around the axis 102 of the spindle 60. As the circular gears 94 rotate around the pin, they cause the annular gear 84 to rotate as it is meshed with the circular gears 94. As the cup shaped gear 70 is severely hindered or even completely stopped, there is a relative rotation between the cup shaped gear 70 and annular gear 84 and therefore a relative rotation between the sleeve 74 and spindle 60.

Because the spindle 60 is preferably attached to the cup shaped gear 70, and the sleeve 74 is attached to the annular shape gear 84 and that the rotary drive from the motor is imparted to the planetary gear system via the circular gears 94, the direction of rotation of the sleeve 74 and spindle 60 when the torque clutch is not slipping (i.e., the cup shaped gear 70 and the annular shaped gear 84 are rotationally locked to each other and there is no relative rotational movement between the two) remains the same as the direction of rotation of the sleeve when the torque clutch slips (i.e., when there is relative rotation between the cup shaped gear 70 and the annular shaped gear 84).

As the sleeve 74 starts to rotate, the anvil 116, which is preferably connected to the sleeve 74 via the ball bearings 132 and which is in its most forward position because the ball bearings 132 are urged to the apex 28 of the V shaped grooves 126 of the sleeve and rear walls of the U shaped recesses by the spring 118, preferably starts to rotate with the sleeve 74. However, as the anvil 116 rotates, the two protrusions 134 preferably engage with the two impact arms 136 which, as they are attached to the spindle 60, are either stationary or rotating much more slowly than the sleeve 74. The anvil 116 is therefore prevented from rotating further with the sleeve 74. Therefore, as the sleeve 74 continues to rotate, the ball bearings 132 are forced to travel backwards along one of the arms 130 of the V shaped grooves 126 due to the ball bearings 132 and the V shaped grooves 126 acting a cam and cam follower to accommodate the relative rotational movement between the anvil 116 and the sleeve 74. As the ball bearings 132 move backwards and as they are engaged with the rear walls of the U shaped recesses 122, they preferably pull the anvil 116 rearwardly (left in FIG. 2) against the biasing force of the spring 118. As the anvil 116 slides rearwardly, the two protrusions 134 slide rearwardly while in sliding engagement with the two impact arms 136. Once the anvil 116 has been moved rearwardly sufficiently, the two protrusions 134 preferably disengage with the impact arms 136 and slide to the rear of the two impact arms 136. In this position, the impact arms 136 no longer hinder the rotational movement of the anvil 116. As such the anvil 116 is free to rotate. Therefore, the rotational movement of the sleeve 74 is imposed onto the anvil 116. Furthermore, as the anvil 116 is free to rotate, the spring 118 drives the anvil 116 forward, causing it to rotate on the sleeve 74 at a much faster rate than the sleeve 74 due to the ball bearings 132 travelling along the arms 130 of the V shape grooves 126 which act as cam and cam followers. As the anvil 116 moves forwards and rotates, the two protrusions 134 preferably move between and head towards the two impact arms 136. As it continues to move forward and rotate, the protrusions 134 tangentially strike impact surfaces on the sides of the two impact arms 136. As the protrusions 134 strike the two impact arms 136, they impart a tangential impact to the spindle 60. Once in engagement with the impact arms 136, the anvil 116 is prevented from further rotation relative to the spindle 60. However, the sleeve 74 continues to rotate forcing the ball bearings 132 rearwadly along the arms 130 of the V shaped slots 126 and causing the whole process to be repeated. In this manner, the tangential impact mechanism tangentially strikes the spindle 60, which in turn transfers the tangential impacts to a cutting tool held with the front end of the spindle 60.

The size and speed of the tangential impact is determined by the mass of the anvil 116, the strength of the spring 118 and the shape of V shaped grooves 126.

The tangentially impact driving force is preferably transferred from the first bevel gear 84 to a cutting tool held within the front end of the spindle 60 via the path indicated by solid line 162. The rate of rotation of the sleeve 74 versus the drive spindle 6 is determined by the gear ratios between the drive spindle 16 and the second gear 22, the gear ratio between the second bevel gear 90 and the first bevel gear 84 and the gear ratio of the planetary gear system. This is a different ratio to that of the spindle 60 and the drive spindle 16. This provides the benefit of having the spindle 60 rotate at one optimized rate when the hammer is operating with only a smooth rotation of the hollow spindle 60 and the sleeve 74 rotate at a second optimized rate when the tangential impact mechanism is operating. The sizes of the cup shaped gear 70, circular gears 94 and annular shaped gear 78 can be determined so that the gear ratios between the drive spindle 16 and the second gear 22 and between the second bevel gear 90 and the first bevel gear 84 can be optimized for driving the spindle 60 while the ratio of the planetary gear system optimizes the rate of rotation for the sleeve 74 of the tangential impact mechanism In order to operate the hammer drill in rotary and hammer mode, the first sleeve 26 is preferably moved into driving engagement with the first gear 20 (downwards in FIG. 2) while the second sleeve 30 is also moved into driving engagement with the second gear 22 (downwards in FIG. 2) by the mode change mechanism. As such, rotation of the second gear 22 preferably results in rotation of the second shaft 28 while the rotation of the first gear 20 results in rotation of the first shaft 24. Therefore rotation of the drive spindle 16 results in rotation of both the first and second shafts 28. The hammer mechanism and rotary mechanism then each operate as described above.

It will be appreciated that the planetary gear system with the torque clutch connected between and supported by the cup shaped gear 70 and annular shaped gear 78 could be manufactured as a single stand-alone component as the torque clutch is completely contained within the planetary gear system and does not require any interaction outside of the planetary gear system with any other part of the hammer drill.

The tangential impact mechanism is described above with the use of V shape grooves 126. The use of V shaped grooves 126 preferably allows the tangential impact mechanism to operate when the spindle 60 is rotated in either direction as is well known in the art. If it is desired that the tangential impact mechanism should only operate in one direction of rotation, then only a single spiral groove angled the appropriate direction is required.

Figure 8:
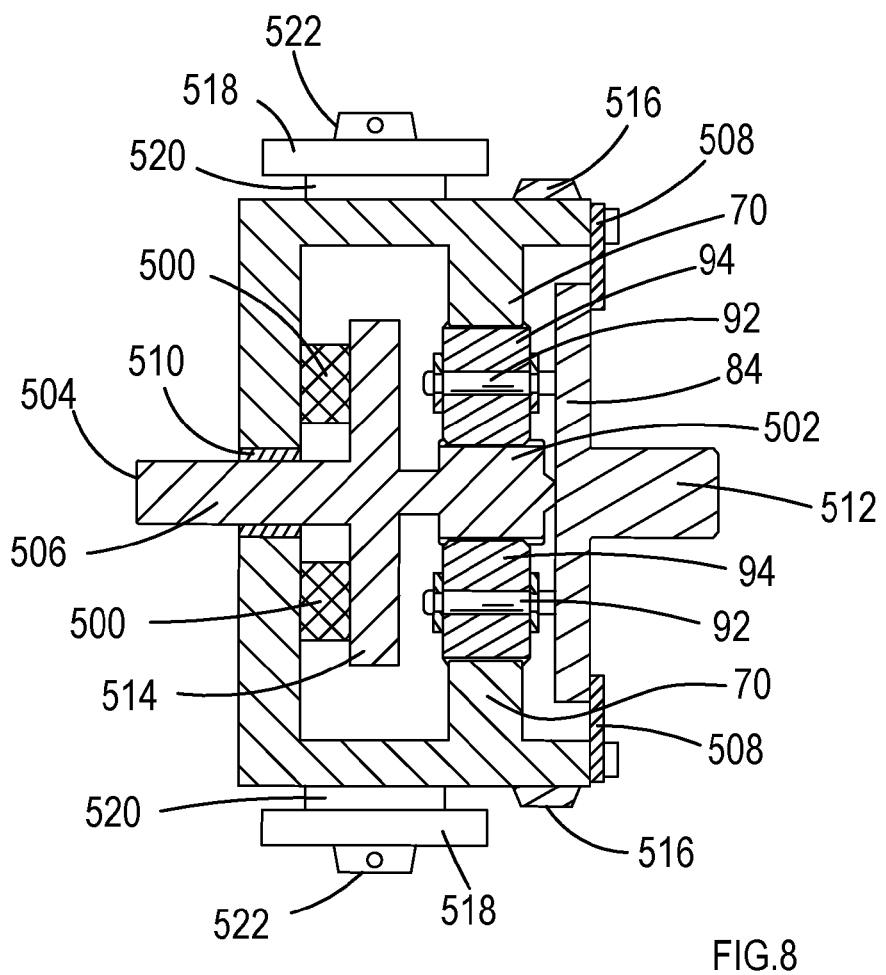
FIG. 8 shows a second example of a schematic diagram of a planetary gear system with a torque clutch constructed as a single component.
Figure 9:
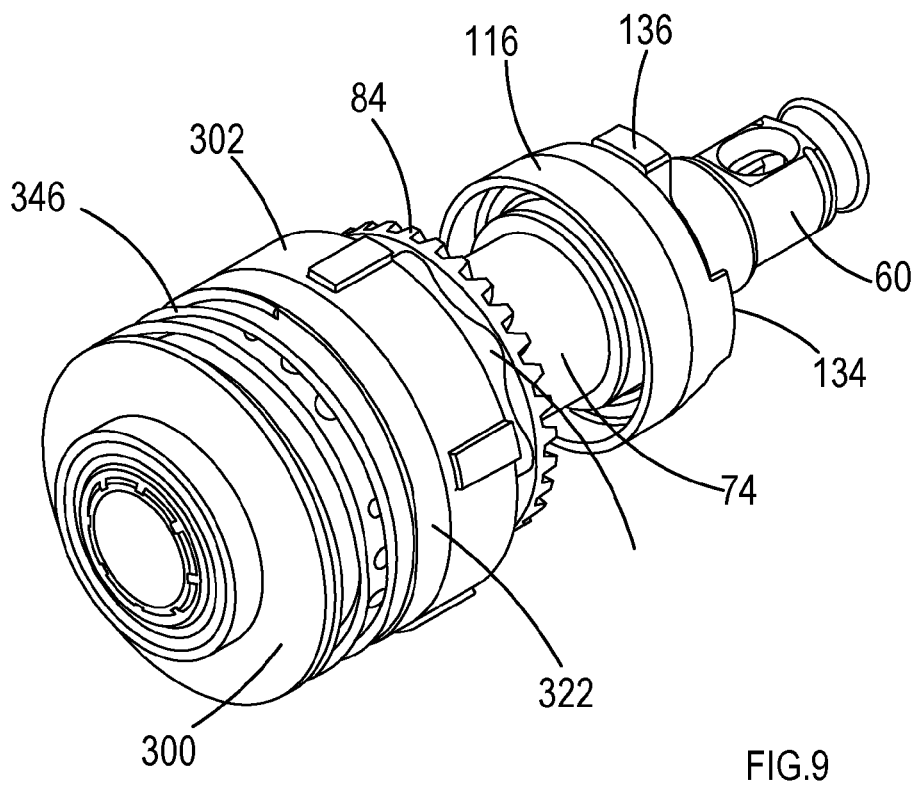
FIG. 9 shows a perspective view of a tangential impact mechanism of a hammer drill.
Figure 10:
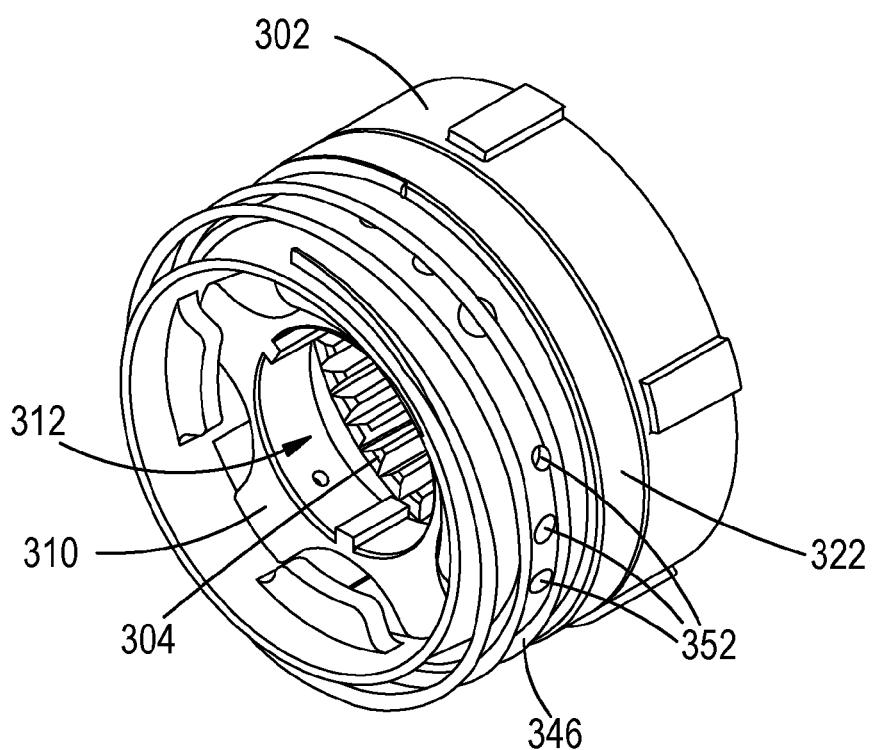
FIG. 10 shows the torque clutch of FIG. 9.
Figure 11:
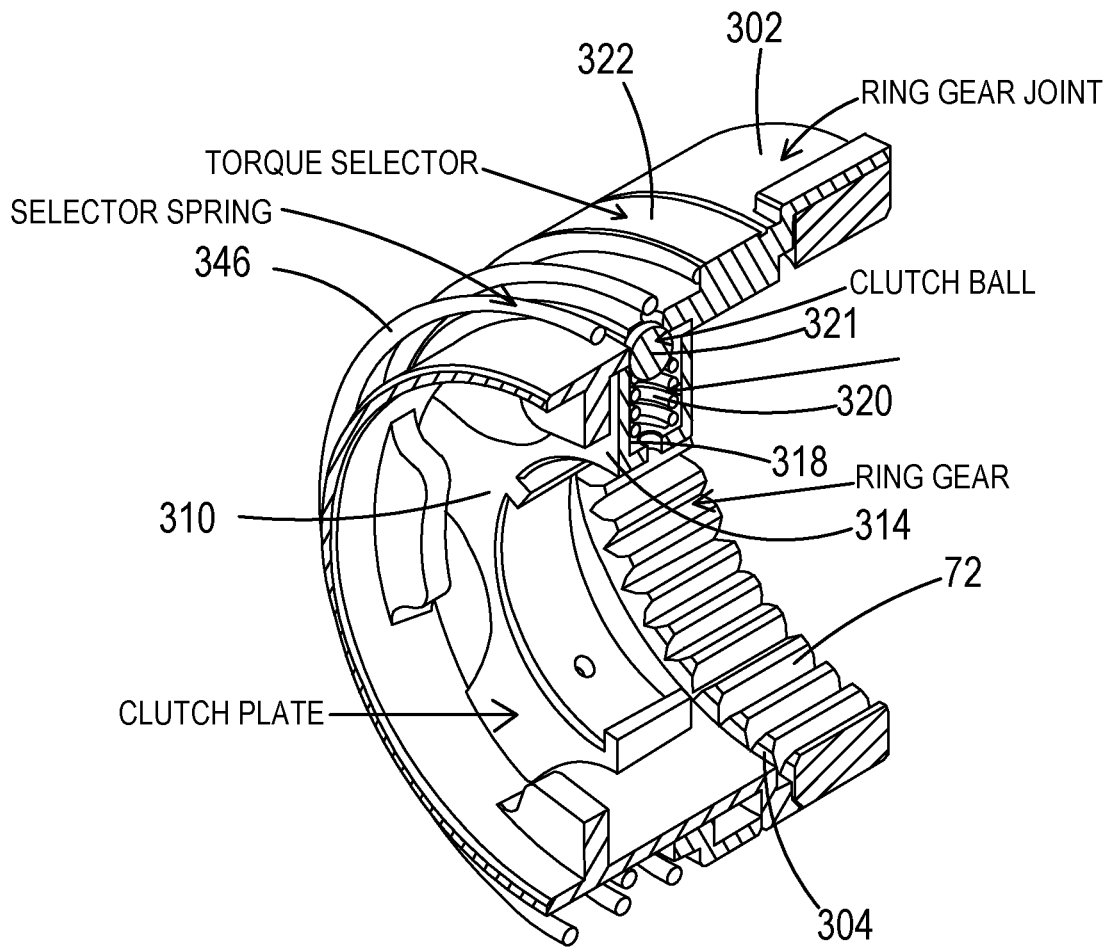
FIG. 11 shows a cut away view of the torque clutch of FIG. 9.
Figure 12:
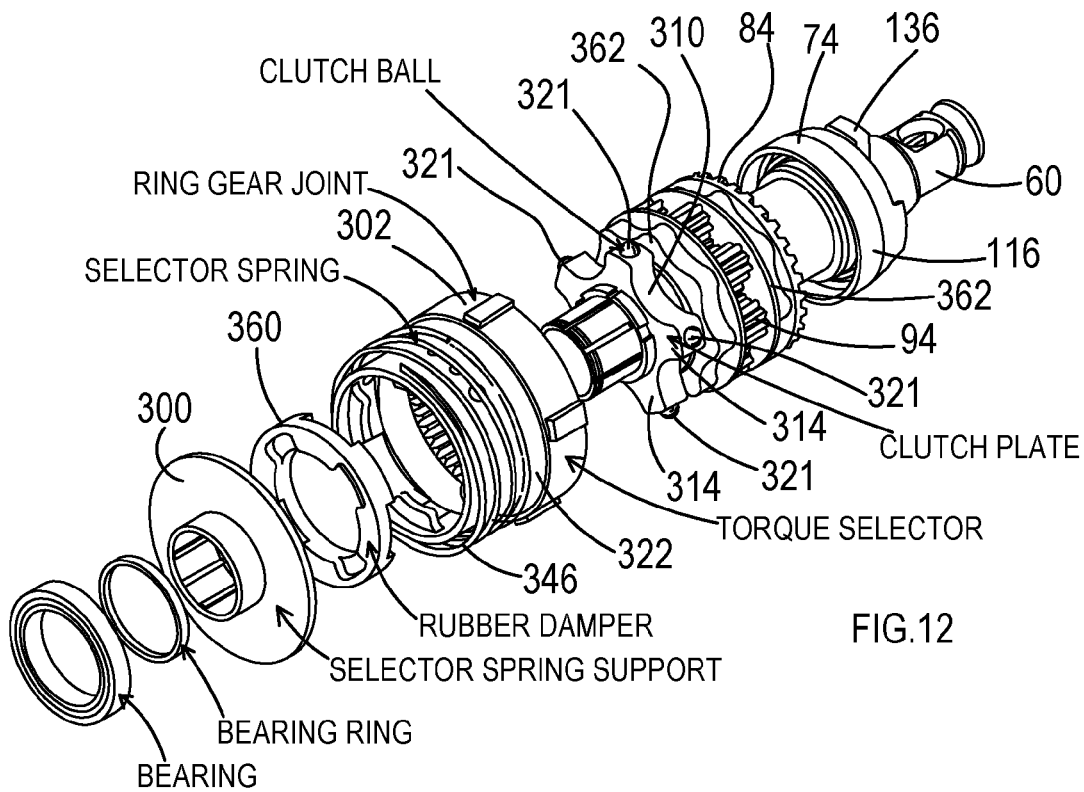
FIG. 12 shows a first exploded view of the tangential impact mechanism of FIG. 9.
Figure 13:
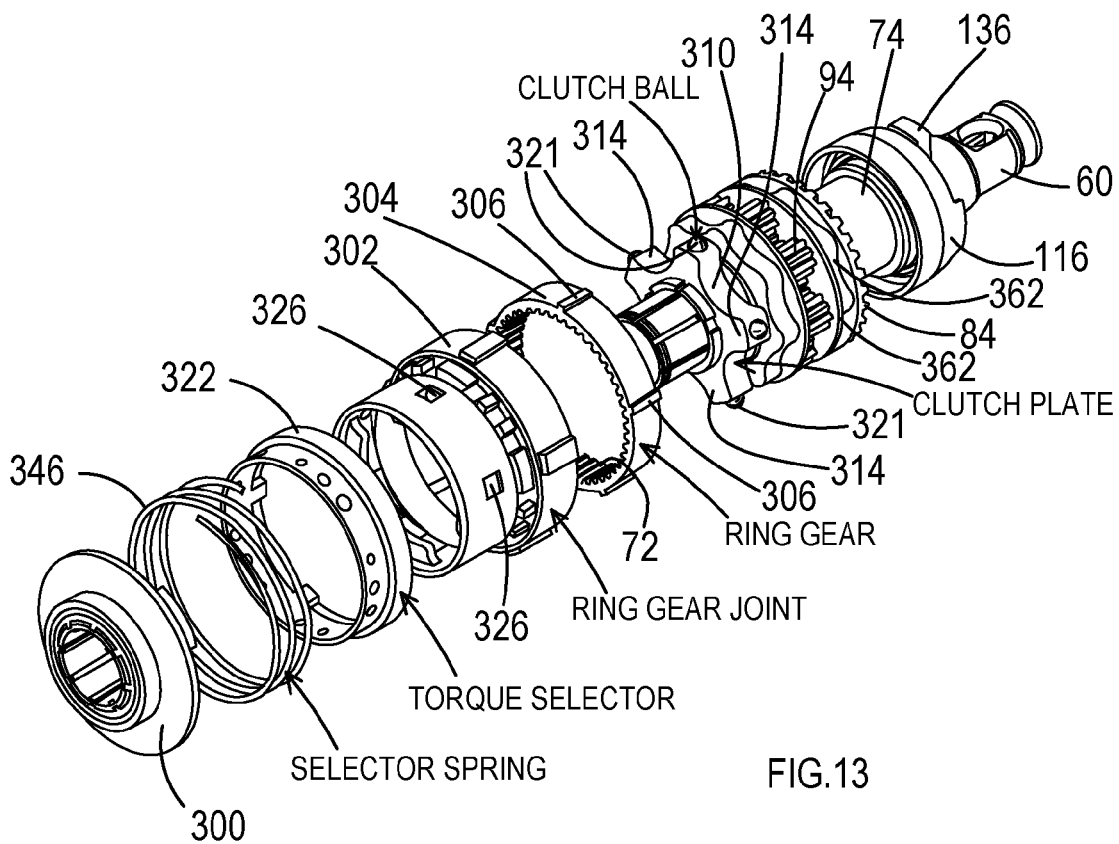
FIG. 13 shows a second exploded view of the tangential impact mechanism of FIG. 9.
Figure 14:
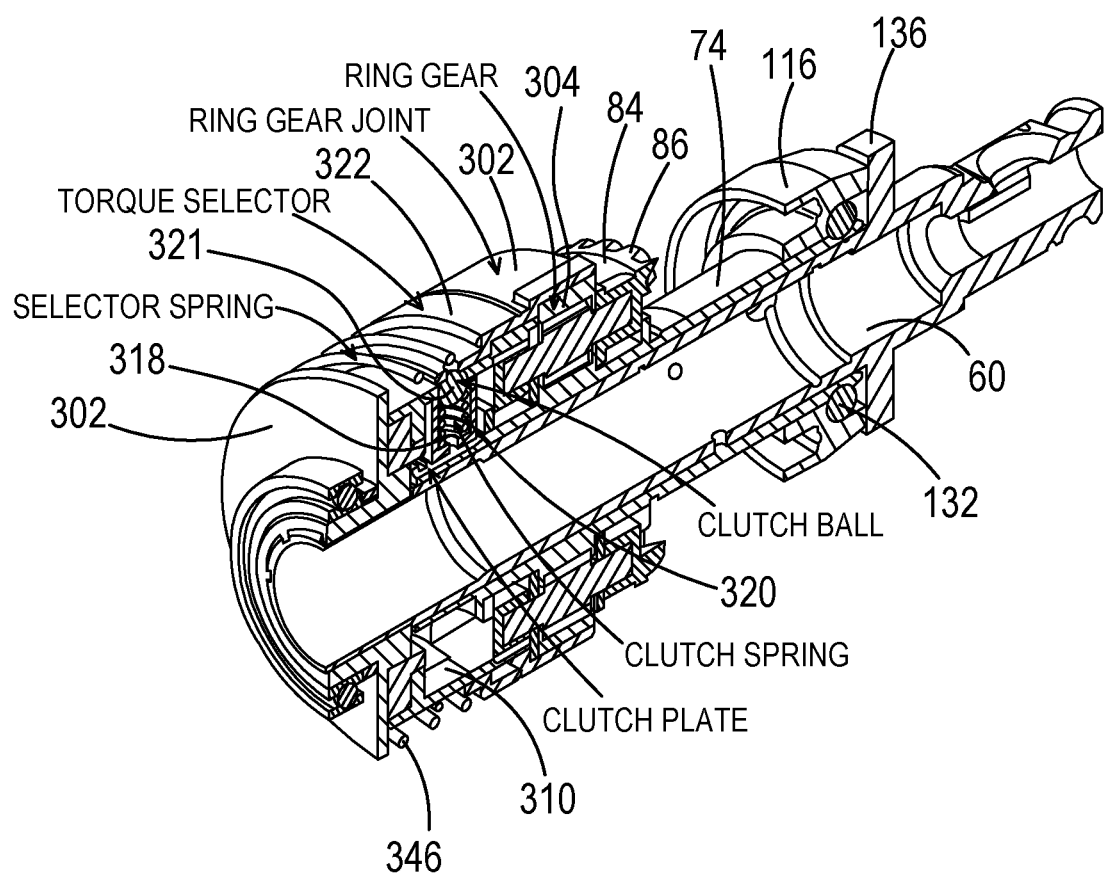
FIG. 14 shows a cross sectional view of the tangential impact mechanism of FIG. 9.
Figure 15A:
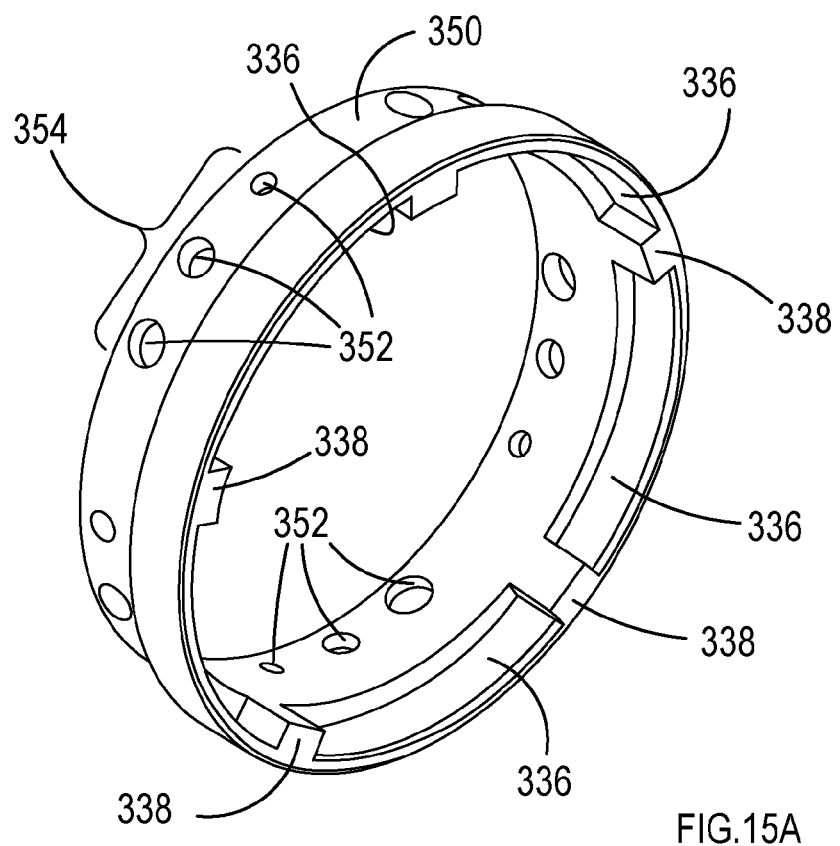
FIG. 15A shows a perspective view of the torque selector ring from a first end.
Figure 15B:
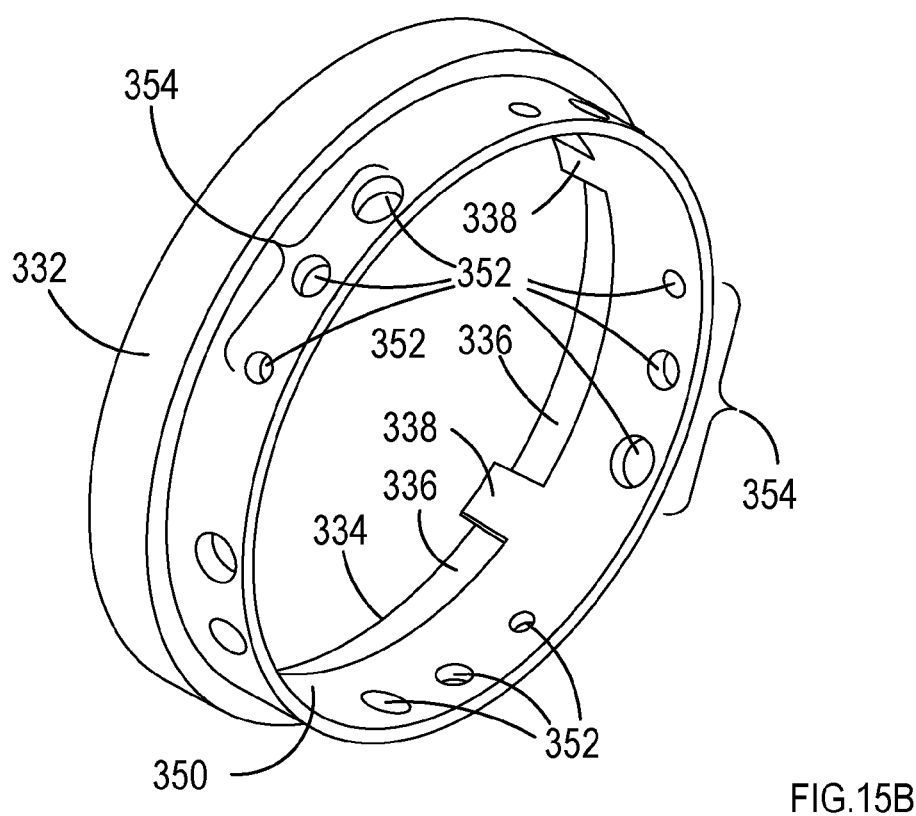
FIG. 15B shows a perspective view of the torque selector ring from a second opposite end.

A second example of a planetary gear system with a torque clutch will now be described with reference to FIG. 8. FIG. 8 shows a planetary gear system with a torque clutch 500 preferably connected between and supported by a ring gear 70 and sun gear 502 which is provided as a single stand-alone component, with the torque clutch 500 completely contained within the planetary gear system. Where the same features are shown in the second example which were present in the first example, the same reference numbers have been used.

The planetary gear system may comprise a ring gear 70 in the form of a cup shaped gear in which is housed the planetary gears 94, the sun gear 502 and a torque clutch 500. The planetary gear system preferably has an input gear 504 which can be rotationally driven by external rotary drive, e.g., an electric motor of a power tool (or other type of machinery). The input gear 504 is preferably directly connected to the sun gear 502 via a shaft 506 which may be supported by bearings 510 on the ring gear 70. The input gear 504, shaft 506, and sun gear 502 can freely rotate in unison relative to the ring gear 70. The planetary gears 94 are preferably located between and mesh with the ring gear 70 and the sun gear 502. The planetary gears 94 may be rotationally mounted on pins 92 which are preferably attached to a carrier 84. The carrier 84 is preferably sandwiched between the end of the sun gear 502 and a plate 508 attached to the ring gear 70 and is prevented from axially moving relative to the ring gear 70. The carrier 84 can freely rotate relative to the ring gear 70. An output gear 512 may be rigidly attached to the carrier 84. The planetary gear system comprising the sun gear 502, the planetary gears 94 and the ring gear 70 function in the normal well known manner, with a rotary drive being applied to the input gear 504 to rotationally drive the out gear 512 and/or ring gear 70 via the planetary gear system.

A radial flange 514 may be rigidly mounted on the shaft 506. Sandwiched between the radial flange 514 and the ring gear 70 may be a torque clutch 500. The torque clutch 500 preferably slips when a torque greater than a predetermined value is applied across the torque clutch 500. Designs of torque clutch are well known in the art and therefore the specific design will not be discussed in detail. Any suitable type of torque clutch can be utilized. For example, the design of the torque clutch described in the first embodiment could be used.

When a rotary drive is applied to the input gear 504 to rotationally drive the out gear 512 via the planetary gear system and the torque across the torque clutch 500 is below the predetermined value, the torque clutch 500 does not slip resulting in the ring gear 70 and sun gear rotating in unison, the output gear 512 rotating at the same rate as the input gear 504. When a rotary drive is applied to the input gear 504 to rotationally drive the out gear 512 via the planetary gear system and the torque across the torque clutch 500 is above the predetermined value (for example when the output gear 512 is prevented from rotating), the torque clutch 500 slips, resulting in the ring gear 70 rotating at a different rate and direction to the input gear 504.

The rotational movement of the ring gear 70 can be transferred to another component via an external gear 516. The ring gear 70 is preferably mounted within a frame 518 via a bearing 520 which allows the ring gear 70 to, rotate, within the frame 518. The frame 518 can be attached to a power tool (or other type of machinery) via fixings 522.

An embodiment of the present invention will now be described with reference to FIGS. 9 to 17. Where the same features which were present in the first example described above with reference to FIGS. 1 to 7, the same reference numbers are used. The difference between the embodiment and the example is that the design of the torque clutch has been altered in order to enable the torque at which the torque clutch slips to be adjustable. All of the other features of the hammer drill remain the same.

Referring to the drawings, a radially extending circular connection ring 300 is rigidly mounted on the hollow spindle 60. Rotation of the hollow spindle 60 preferably results in rotation of the connection ring 300. A tubular ring gear support 302, which preferably surrounds the spindle 60 and sleeve 74, is rigidly attached to the connection ring 300. Ring gear support 302 preferably has an annular space 312 surrounding the spindle 60 and sleeve 74. Rotation of the ring gear support 302 preferably results in rotation of the connection ring 300. Mounted in a rigid manner within the ring gear support 302 is preferably a ring gear 304 of a planetary gear system which has teeth 72. Splines 306 on the ring gear 304 preferably engage with slots 308 in the ring gear support 302 to prevent relative rotation between the two. As such, rotation of the ring gear support 302 results in rotation of the ring gear 304.

A circumferential path 324 may be formed on the inner wall 316 on the inside ring gear support 302, adjacent the ring gear 304 in an axial direction. Preferably the ring gear support 302 acts as a "path support" for the path 324. Four square apertures 326 are preferably formed equidistantly along the path 324 in a symmetrical manner. Ramps 328 are preferably formed along the path on either side of each square aperture 326, leading into each square aperture 326. The radial distance of the path 324 from the longitudinal axis 102 between the ramps 328 preferably remains constant, while the radial distance of the path 324 from the longitudinal axis 102 along the ramps 328 preferably increases as it approaches the square apertures 326.

A torque selector ring 332 may be mounted on a rear section 330 of the ring gear support 302. Four recesses 336 may be disposed inside the torque selector ring 332, at the forward end 334 of the torque selector ring 332. The four recesses 336 are preferably separated by four pegs 338. When the torque selector ring 332 is mounted on the ring gear support 302, the recesses 336 preferably sit on and capable of sliding over large and small splines 340, 342 formed on the ring gear support 302. Gaps 344 may be formed between the large and small splines 340, 342. Each peg 338 is capable of locating in one of the gaps 344. A large spring 346 is preferably sandwiched between a shoulder 348 formed on the outside of the torque selector ring 332 and the connection ring 300 which biases the torque selector ring 332 forwardly. When the pegs 338 are aligned with the gaps 344, the large spring 346 preferably urges the pegs 338 into the gaps 344. When the pegs 338 are in the gaps 344, the torque selector ring 332 is preferably prevented from rotating on the ring gear support 302. In order to disengage the pegs 338 from the gaps 344, an operator has to slide the torque selector ring 322 rearwardly on the ring gear support 302 against the biasing force of the large spring 346 to slide the pegs 338 out of the gaps 344. Preferably there are three gaps 344 between the large splines 340 corresponding to three angular positions of torque selector ring 332 on the ring gear support 302.

Four sets 354 of three holes 352 are preferably formed circumferentially through the rear section 350 of the torque selector ring 322 in a symmetrical fashion. The three holes 352 in each set 354 preferably have different diameters, starting with a large diameter, a medium diameter and a small diameter. When the pegs 338 are located in one of the gaps 344, one of the holes 352 in each set 354 aligns with a square aperture 326 in the ring gear support 302, all of the holes 352 in alignment being of the same diameter. The hole 353 which aligns with the square aperture 326 will depend on which gaps 344 the pegs 338 are located in. When the pegs 338 are located in the first gap 344 of each set, the large holes 352 will align with the square apertures 326. When the pegs 338 are located in the second gap 344 of each set, the medium holes 352 will align with the square apertures 326. When the pegs 338 are located in the third gap 344 of each set, the small holes 352 will align with the square apertures 326. In order to change the size of the holes 352 aligned with the square apertures 326, an operator has to slide the torque selector ring 322 rearwardly on the ring gear support 302 against the biasing force of the large spring 346 to slide the pegs 338 out of the gaps 344, then rotate it until the pegs 338 align with another gap 344 within each set and release the toque selector ring 322 and allow the pegs 338 to enter the new gaps 344, and aligning a different sized hole 352 with the square apertures 326.

A bearing mount 310 (also referred to as a "bearing support mechanism") is preferably rigidly mounted on the sleeve 74, inside the ring gear support 302 within the annular space 312 adjacent the ring gear 304 in an axial direction (but separated by a spacer 362). The bearing mount 310 preferably has four identical arms 314 which extend radially outwards in a symmetrical manner with adjacent arms 314 being orientated at 90 degrees relative to each other, toward, but make no contact with, the path 324 formed on the inner wall 316 of the ring gear support 302. Formed in each arm 314 in a symmetrical manner is a tubular passage 318 which preferably extends radially outwards along the length of each of the arms 314, ending with an aperture at the outer end of the arm 314 facing the path 324 formed on the inner wall 316 of the ring gear support 302. A helical spring 320 which preferably extends the length of the passage 318 may be mounted within each tubular passage 318. A ball bearing 321, which preferably has a smaller diameter than the passage 318, may be located in each aperture of the passages 318 and abutted against the spring 320, the spring 320 preferably biasing each ball bearing 321 out of its respective aperture. The ball bearing 321 is preferably biased outwardly and against the path 324 formed on the inner wall 316 of the ring gear support 302.

Under normal conditions the sleeve 74 and bearing mount 310 will preferably rotate inside of ring gear support 302 until each of the bearings 321 travels along a ramp 328 and engages with the square apertures 326, with the ball bearings 321 able to extend radially outwardly through the square apertures 326. The amount by which the ball bearings 321 can extend into and through the square apertures 326 will depend on the diameter of the holes 352 in torque selector ring 322 aligned with the square apertures 326. The larger the diameter, the more of the ball bearings 321 can extend into and through the square apertures 326. Once the ball bearings 321 are located in square apertures 326, torque can be transferred from the sleeve 74 via the bearing mount 310, ball bearings 321 and ring gear support 302 to the hollow spindle 60 and therefore they will rotate as a single unit. As such, the torque clutch does not slip. If an excessive torque, which is greater than the torque threshold of the torque clutch, is placed across the torque clutch, the ball bearings 321 will preferably ride up the ramps 328 against the biasing force of the springs 320 allowing the sleeve 70 and bearing mount 310 to rotate relative to the ring gear support 302 and hollow spindle 60. As such, the torque clutch slips. The sleeve 74 and bearing mount 310 will preferably continue to rotate with the ball bearings 321 travelling along the path 324 unit the ball bearings 321 align again with the square apertures 326. If the torque has reduced below the threshold, then the ball bearings 321 will locate in the square apertures 326. If the torque has not dropped below the threshold, the process will repeat itself with the ball bearings 321 travelling along the path 324, repetitively entering and leaving the square apertures 326. A rubber dampener 360 may be sandwiched between the bearing mount 310 and the connection ring 300 to absorb vibration generated by the slipping action of the torque clutch.

The torque threshold of the torque clutch is preferably dependent on how far the ball bearings 321 extend into and through the square apertures 326 which in turn is dependent on the size of the holes 352 aligned with the square apertures 326. By altering the size of the holes 352 aligned with the square apertures 326, by rotation of the torque selector ring 322, the torque threshold of the clutch be adjusted. As such, the torque selector ring acts as a "penetration adjustment mechanism," the size of the holes 352 aligned with the apertures 326 determining the amount of penetration of the bearings 321 into the apertures 326.

The hammer drill according to the embodiment operates in the same manner as the example described above with reference to FIGS. 1 to 7 except that the torque threshold at which the torque clutch slips to start the tangential impact mechanism can be adjusted between three settings. Such adjustment is achieved by the operator rotating the torque selector ring 322 on the ring gear support 302 to align appropriately size holes 352 with the square apertures 326 prior to the use of the hammer drill. Once the torque threshold has been set, the operator uses the hammer drill. When the torque across the torque clutch is below the threshold, the tangential impact mechanism is preferably switched off and the hammer drill acts a traditional hammer. When the torque across the torque clutch is above the threshold which has been set be the operator, the tangential impact mechanism is preferably activated and tangential impacts are imparted onto the hollow spindle 60.

Figure 16A:
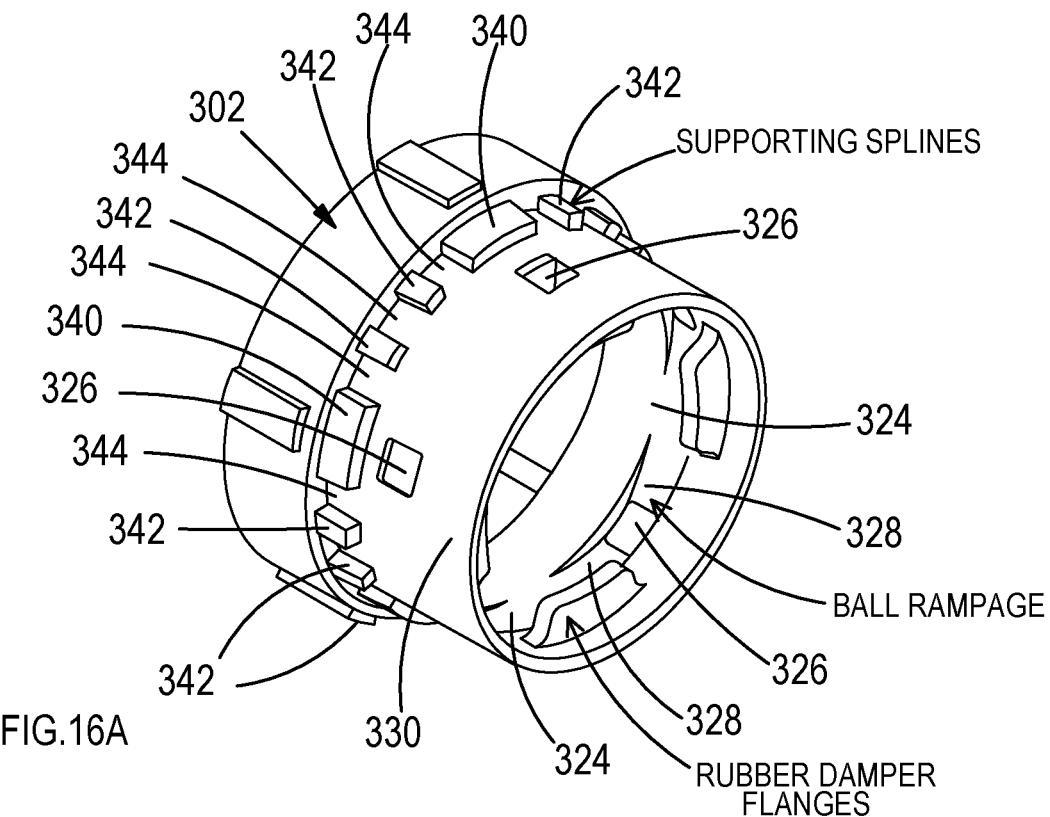
FIG. 16A shows a perspective view of the ring gear support from a first end.
Figure 16B:
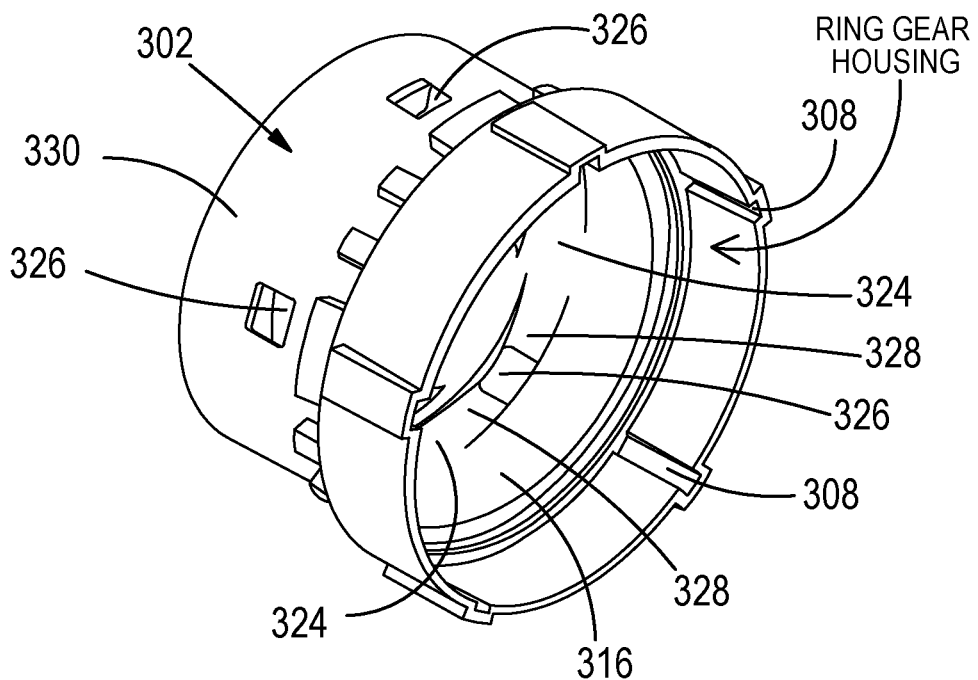
FIG. 16B shows a perspective view of the ring gear support from a second opposite end.
Figures 17A, 17B:
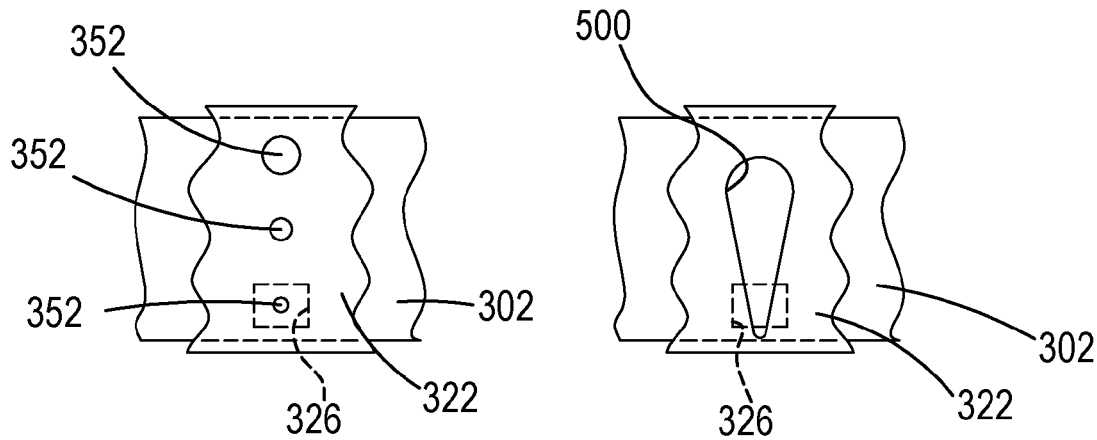
FIG. 17A shows a schematic diagram of part of the selector ring and ring gear support of FIGS. 15 and 16.
FIG. 17B shows a schematic diagram of an alternate design of a selector ring with the ring gear support of FIG. 16.

It will be appreciated that the design of torque selector ring 322 with three holes 352 (shown schematically in FIG. 16A) can be easily altered with alternative designs while enabling it to function in the same manner. For example the number and/or shape of the holes can be altered. Alternatively, as shown in FIG. 16B, a single elongate hole 500, having a length greater than the aperture 326 but a width which decreases along its length, can be utilized. The width can extend from a dimension which is a similar width of the aperture (or greater) at one end to a width which is substantially less than that of an aperture 326 at the other end. In use, a portion of each of the elongate holes 500 may be located over the apertures 326. The size of the portion of the elongate holes 50 aligned with the apertures 326 can be adjusted by rotating the torque selector ring 322 to place a different portion of the same hole 500 having a different size over the aperture 326. As such, the amount that the bearings 321 can enter the apertures 326 can be adjusted by adjusting the size of the portions of the elongate holes 500 aligned with the apertures 326.

Figure 18:
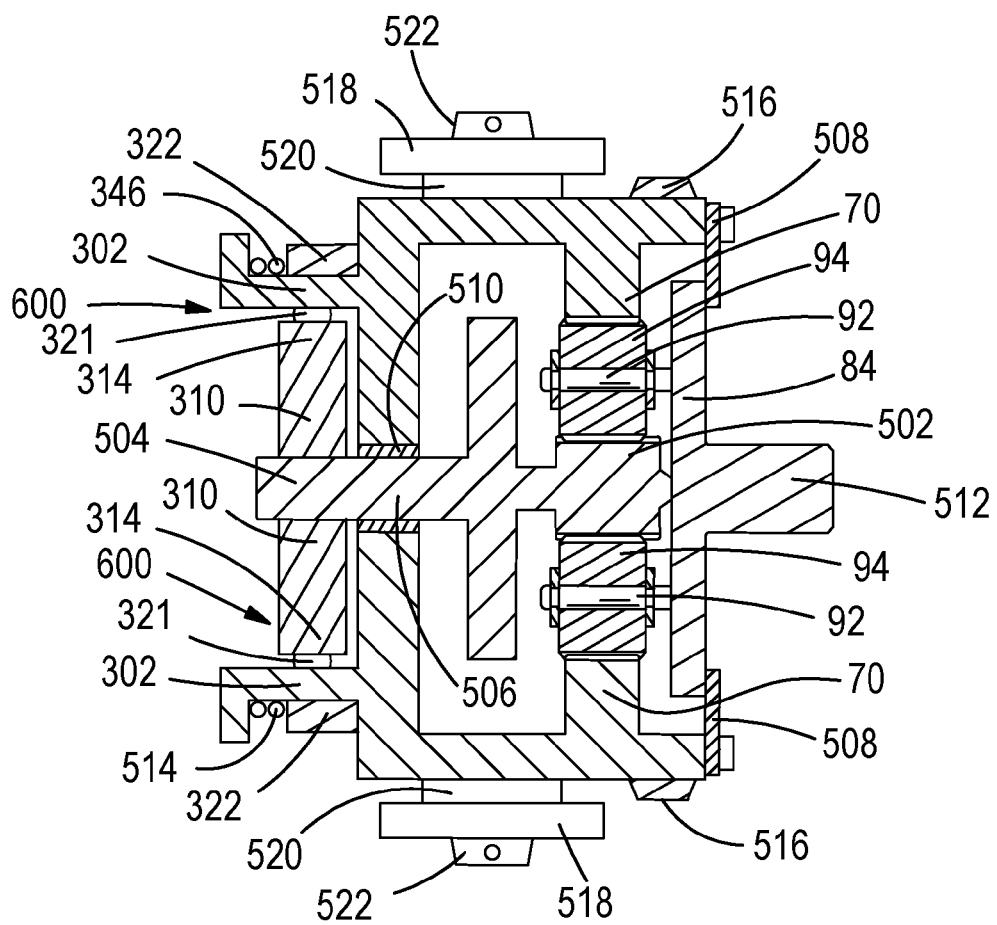
FIG. 18 shows a schematic diagram of a planetary gear system with an adjustable torque clutch constructed as a single component.

A second embodiment of a planetary gear system with a torque clutch will now be described with reference to FIG. 18. FIG. 18 shows a planetary gear system with an adjustable torque clutch 600 connected between and supported by a ring gear 70 and sun gear 502 which is provided as a single stand-alone component, with the torque clutch 600 completely contained within the planetary gear system. Where the same features are shown in the second embodiment which were present in the second example (which also included the same reference numbers for those features which were present in the first example), the same reference numbers have been used.

The planetary gear system preferably comprises a ring gear 70 in the form of a cup shaped gear in which is housed the planetary gears 94, the sun gear 502 and a torque clutch 600. The planetary gear system has an input gear 504 which can be rotationally driven by an external rotary drive, e.g., an electric motor of a power tool (or other type of machinery). The input gear 504 is preferably directly connected to the sun gear 502 via a shaft 506 which is supported by bearings 510 on the ring gear 70. The input gear 504, shaft 506, and sun gear 502 can freely rotate in unison relative to the ring gear 70. The planetary gears 94 are preferably located between and mesh with the ring gear 70 and the sun gear 502. The planetary gears 94 may be rotationally mounted on pins 92 which are attached to a carrier 84. The carrier 84 is preferably sandwiched between the end of the sun gear 502 and a plate 508 attached to the ring gear 70 and is prevented from axially moving relative to the ring gear 70. The carrier 84 can freely rotate relative to the ring gear 70. An output gear 512 may be rigidly attached to the carrier 84. The planetary gear system comprising the sun gear 502, the planetary gears 94 and the ring gear 70 function in the normal well known manner, with a rotary drive being applied to the input gear 504 to rotationally drive the out gear 512 and/or ring gear 70 via the planetary gear system.

The torque clutch 600 is the same design and operates in the same manner as the torque clutch described in the first embodiment with reference to FIGS. 9 to 17 and as such, the same features which are present in the first embodiment are present in the second embodiment. The bearing mount 310 may be rigidly connected to the shaft 506. The path 324 is formed on the equivalent of the ring gear support 302 attached to the ring gear 70 and preferably faces the ball bearings 321 which extend from the bearing mount 310 and engage with the path 324. The torque selector ring 322 may be mounted on the ring gear support 302 and is biased into an angular locked position by a spring 346. The path preferably comprises apertures 326 and the torque selector ring 322 comprises holes 352 which operate in the same manner as the torque clutch described in the first embodiment. By rotating the torque selector ring on the ring gear support 302, the torque at which the torque clutch 600 slips can be adjusted. The operation of the torque clutch is the same manner as that described for the torque clutch in the second embodiment.

When a rotary drive is applied to the input gear 504 to rotationally drive the out gear 512 via the planetary gear system and the torque across the torque clutch 600 is below the predetermined value, the torque clutch 600 does not slip resulting in the ring gear 70 and sun gear 502 rotating in unison, the output gear 512 rotating at the same rate as the input gear 504. When a rotary drive is applied to the input gear 504 to rotationally drive the out gear 512 via the planetary gear system and the torque across the torque clutch 600 is above the predetermined value (for example when the output gear 512 is prevented from rotating), the torque clutch 600 slips, resulting in the ring gear 70 rotating at a different rate and direction to the input gear 504. The predetermined value of torque at which the torque clutch 600 slips can be adjusted by rotation of the torque selector ring 322 on the ring gear support 302.

The rotational movement of the ring gear 70 can be transferred to another component via an external gear 516. The ring gear 70 is mounted within a frame 518 via a bearing 520 which allows the ring gear 70 to rotate within the frame 518. The frame 518 can be attached to a power tool (or other type of machinery) via fixings.

While the present invention has been described in relation to a hammer drill, it will be appreciated that it is applicable to any impacting power tool or other tools requiring a torque clutch.

The invention claimed is:

1. A planetary gear system comprising:
a sun gear;
a ring gear co-axial with the sun gear;
at least one planetary gear which meshes with both the sun gear and the ring gear;
a planetary gear carrier which rotationally supports the at least one planetary gear;
a torque clutch supported by and connected directly between two of the sun gear, the ring gear, the at least one planetary gear and the planetary gear carrier, the torque clutch preventing relative rotation of the two of the sun gear, the ring gear, the at least one planetary gear and the planetary gear carrier when an acting torque is below a predetermined torque value and allows relative rotation of the two of the sun gear, the ring gear, the at least one planetary gear and the planetary gear carrier when the acting torque is above the predetermined torque value; and
a torque threshold adjustment mechanism for adjusting the predetermined torque value at which the torque clutch slips,
wherein the torque clutch has a first part and a second part, the first part rotating relative to the second part when the torque clutch is slipping, the first part and second part rotating in unison when the torque clutch is not slipping,
wherein the first part comprises a path support comprising a circular path formed on a surface of the path support, and a plurality of apertures formed through the path at predetermined positions along the path, and
wherein the second part comprises a bearing support mechanism located adjacent to the path support and rotatable relative to the path support, the bearing support mechanism comprising a plurality of bearings moveably mounted on the bearing support mechanism biased to extend from and engage with the path.

2. The planetary gear system of claim 1 wherein the torque clutch connects between the sun gear and the ring gear.

3. The planetary gear system of claim 1
wherein the bearings slide along the path when the bearing support mechanism rotates relative to the path support, the bearings aligning with and extending into the apertures when the bearing support mechanism is located at predetermined angular positions relative to the path support, the predetermined torque value of the torque at which the torque clutch slips being dependent on the amount the bearings extend into the apertures; and
a penetration adjustment mechanism located adjacent to the path support, the penetration adjustment mechanism co-operating with the path support to adjust the amount by which the bearings can extend into the apertures when the bearings are aligned with the apertures.

4. The planetary gear system of claim 3 wherein the penetration adjustment mechanism comprises a plurality of sets of holes, the holes in each set being of different sizes relative to the holes in the same set, the size and configuration of the holes in each set being the same size as in the other sets;
wherein the penetration adjustment mechanism is capable of being rotated relative to the path support;
wherein correspondingly sized holes in each of the sets are capable of aligning with the apertures when the penetration adjustment mechanism is at predetermined angular positions relative to the path support, the size of the holes aligned with the apertures determining the amount by which the bearings can extend into the apertures;
wherein the predetermined torque value at which the torque clutch slips is adjusted by rotating the penetration adjustment mechanism relative to the path support in order to align different sized holes with the apertures.

5. The planetary gear system of claim 4 wherein the path further comprises ramps which lead into and/or out of the apertures.

6. The planetary gear system of claim 5 wherein the path support comprises a tubular sleeve and capable of being rotated about its longitudinal axis, the path being formed on an inner wall of the path support;
the penetration adjustment mechanism further comprising a second sleeve which is co-axial with and surrounds the path support, the penetration adjustment mechanism being rotatable about its longitudinal axis relative to the path support;
wherein the bearing support mechanism is located inside of the path support, the bearings extending radially outwardly from the longitudinal axis towards and into engagement with the path.

7. The planetary gear system of claim 3 wherein the penetration adjustment mechanism comprises a plurality of holes, each of the holes having the same dimensions as the other holes, the penetration adjustment mechanism being capable of being rotated relative to the path support;
wherein correspondingly sized portions of each of the holes are capable of aligning with the apertures when the penetration adjustment mechanism is at predetermined angular positions relative to the path support, the size of the portion of the holes aligned with the apertures determining the amount by which the bearings can extend into the apertures;
wherein the predetermined torque value at which the torque clutch slips is adjusted by rotating the penetration adjustment mechanism relative to the path support in order to align different sized portions of the holes with the apertures.

8. The planetary gear system of claim 7 wherein the path further comprises ramps which lead into and/or out of the apertures.

9. The planetary gear system of claim 8 wherein the path support comprises a tubular sleeve and capable of being rotated about its longitudinal axis, the path being formed on an inner wall of the path support;
the penetration adjustment mechanism further comprising a second sleeve which is co-axial with and surrounds the path support, the penetration adjustment mechanism being rotatable about its longitudinal axis relative to the path support;
wherein the bearing support mechanism is located inside of the path support, the bearings extending radially outwardly from the longitudinal axis towards and into engagement with the path.

10. A power tool comprising:
a housing:
a motor mounted in the housing having a drive spindle;

an output spindle capable of being rotationally driven by the drive spindle via a torque clutch, the output spindle having an impact surface and a central axis; and a gear system comprising:
- a sun gear;
- a ring gear co-axial with the sun gear;
- at least one planetary gear which meshes with both the sun gear and the ring gear;
- a planetary gear carrier which rotationally supports the at least one planetary gear;
- a torque clutch supported by and connected directly between two of the sun gear, the ring gear, the at least one planetary gear and the planetary gear carrier, the torque clutch preventing relative rotation of the two of the sun gear, the ring gear, the at least one planetary gear and the planetary gear carrier when an acting torque is below a predetermined torque value and allows relative rotation of the two of the sun gear, the ring gear, the at least one planetary gear and the planetary gear carrier when the acting torque is above the predetermined torque value; and
- a torque threshold adjustment mechanism for adjusting the predetermined torque value at which the torque clutch slips,
- wherein the torque clutch has a first part and a second part, the first part rotating relative to the second part when the torque clutch is slipping, the first part and second part rotating in unison when the torque clutch is not slipping,
- wherein the first part comprises a path support comprising a circular path formed on a surface of the path support, and a plurality of apertures formed through the path at predetermined positions along the path, and
- wherein the second part comprises a bearing support mechanism located adjacent to the path support and rotatable relative to the path support, the bearing support mechanism comprising a plurality of bearings moveably mounted on the bearing support mechanism biased to extend from and engage with the path.

11. The power tool of claim 10, wherein the torque clutch connects between the sun gear and the ring gear.

12. The power tool of claim 10,
wherein the bearings slide along the path when the bearing support mechanism rotates relative to the path support, the bearings aligning with and extending into the apertures when the bearing support mechanism is located at predetermined angular positions relative to the path support, the predetermined torque value of the torque at which the torque clutch slips being dependent on the amount the bearings extend into the apertures; and
a penetration adjustment mechanism located adjacent to the path support, the penetration adjustment mechanism co-operating with the path support to adjust the amount by which the bearings can extend into the apertures when the bearings are aligned with the apertures.

13. The power tool of claim 12, wherein the penetration adjustment mechanism comprises a plurality of sets of holes, the holes in each set being of different sizes relative to the holes in the same set, the size and configuration of the holes in each set being the same size as in the other sets;
wherein the penetration adjustment mechanism is capable of being rotated relative to the path support;
wherein correspondingly sized holes in each of the sets are capable of aligning with the apertures when the penetration adjustment mechanism is at predetermined angular positions relative to the path support, the size of the holes aligned with the apertures determining the amount by which the bearings can extend into the apertures;
wherein the predetermined torque value at which the torque clutch slips is adjusted by rotating the penetration adjustment mechanism relative to the path support in order to align different sized holes with the apertures.

14. The power tool of claim 13, wherein the path further comprises ramps which lead into and/or out of the apertures.

15. The power tool of claim 14, wherein the path support comprises a tubular sleeve and capable of being rotated about its longitudinal axis, the path being formed on an inner wall of the path support;
the penetration adjustment mechanism further comprising a second sleeve which is co-axial with and surrounds the path support, the penetration adjustment mechanism being rotatable about its longitudinal axis relative to the path support;
wherein the bearing support mechanism is located inside of the path support, the bearings extending radially outwardly from the longitudinal axis towards and into engagement with the path.

16. The power tool of claim 12, wherein the penetration adjustment mechanism comprises a plurality of holes, each of the holes having the same dimensions as the other holes, the penetration adjustment mechanism being capable of being rotated relative to the path support;
wherein correspondingly sized portions of each of the holes are capable of aligning with the apertures when the penetration adjustment mechanism is at predetermined angular positions relative to the path support, the size of the portion of the holes aligned with the apertures determining the amount by which the bearings can extend into the apertures;
wherein the predetermined torque value at which the torque clutch slips is adjusted by rotating the penetration adjustment mechanism relative to the path support in order to align different sized portions of the holes with the apertures.

17. The power tool of claim 16, wherein the path further comprises ramps which lead into and/or out of the apertures.

18. The power tool of claim 17, wherein the path support comprises a tubular sleeve and capable of being rotated about its longitudinal axis, the path being formed on an inner wall of the path support;
the penetration adjustment mechanism further comprising a second sleeve which is co-axial with and surrounds the path support, the penetration adjustment mechanism being rotatable about its longitudinal axis relative to the path support;
wherein the bearing support mechanism is located inside of the path support, the bearings extending radially outwardly from the longitudinal axis towards and into engagement with the path.

19. A planetary gear system comprising:
- a sun gear;
- a ring gear co-axial with the sun gear;
- at least one planetary gear which meshes with both the sun gear and the ring gear;
- a planetary gear carrier which rotationally supports the at least one planetary gear;
- a torque clutch supported by and connected directly between two of the sun gear, the ring gear, the at least one planetary gear and the planetary gear carrier, the torque clutch preventing relative rotation of the two of the sun gear, the ring gear, the at least one planetary gear and the planetary gear carrier when an acting torque is below a predetermined torque value and allows relative rotation of the two of the sun gear, the ring gear, the at least one planetary gear and the planetary gear carrier when the acting torque is above the predetermined torque value; and a torque threshold adjustment mechanism for adjusting the predetermined torque value at which the torque clutch slips, wherein the torque clutch has a first part and a second part, the first part rotating relative to the second part when the torque clutch is slipping, the first part and second part rotating in unison when the torque clutch is not slipping, and wherein the torque clutch connects between the sun gear and the ring gear.

20. A power tool comprising:

a housing:

a motor mounted in the housing having a drive spindle;

an output spindle capable of being rotationally driven by the drive spindle via a torque clutch, the output spindle having an impact surface and a central axis; and a gear system comprising:

a sun gear;

a ring gear co-axial with the sun gear;

at least one planetary gear which meshes with both the sun gear and the ring gear;

a planetary gear carrier which rotationally supports the at least one planetary gear;

a torque clutch supported by and connected directly between two of the sun gear, the ring gear, the at least one planetary gear and the planetary gear carrier, the torque clutch preventing relative rotation of the two of the sun gear, the ring gear, the at least one planetary gear and the planetary gear carrier when an acting torque is below a predetermined torque value and allows relative rotation of the two of the sun gear, the ring gear, the at least one planetary gear and the planetary gear carrier when the acting torque is above the predetermined torque value; and a torque threshold adjustment mechanism for adjusting the predetermined torque value at which the torque clutch slips, wherein the torque clutch has a first part and a second part, the first part rotating relative to the second part when the torque clutch is slipping, the first part and second part rotating in unison when the torque clutch is not slipping, and wherein the torque clutch connects between the sun gear and the ring gear.

* * * * *